(12) United States Patent
Moseley et al.

(10) Patent No.: US 11,174,958 B2
(45) Date of Patent: Nov. 16, 2021

(54) GATE VALVE AND METHOD OF REPAIRING SAME

(71) Applicant: Jet Oilfield Services, LLC, Dallas, TX (US)

(72) Inventors: Lorne Randall Moseley, Renton, LA (US); Robert Timothy Greer, Minden, LA (US)

(73) Assignee: Jet Oilfield Services, LLC, Dallas, TX (US)

( * ) Notice: Subject to any disclaimer, the term of this patent is extended or adjusted under 35 U.S.C. 154(b) by 0 days.

(21) Appl. No.: 16/292,156

(22) Filed: Mar. 4, 2019

(65) Prior Publication Data

US 2020/0240537 A1 Jul. 30, 2020

Related U.S. Application Data

(60) Provisional application No. 62/796,531, filed on Jan. 24, 2019.

(51) Int. Cl.
| | |
|---|---|
| *F16K 15/02* | (2006.01) |
| *F16K 25/02* | (2006.01) |
| *F16K 3/16* | (2006.01) |
| *F16K 3/30* | (2006.01) |
| *F16K 3/02* | (2006.01) |

(52) U.S. Cl.
CPC ............ *F16K 25/02* (2013.01); *F16K 3/0227* (2013.01); *F16K 3/16* (2013.01); *F16K 3/30* (2013.01)

(58) Field of Classification Search
CPC ........ F16K 3/02; F16K 3/0209; F16K 3/0227; F16K 3/36
See application file for complete search history.

(56) References Cited

U.S. PATENT DOCUMENTS

| | | | |
|---|---|---|---|
| 3,078,865 A | | 2/1963 | Estes et al. |
| 3,095,004 A | * | 6/1963 | Jackson, Jr. ............... F16K 3/36 137/246.11 |
| 3,215,157 A | | 11/1965 | Lowrey et al. |
| 3,347,261 A | | 10/1967 | Yancey |

(Continued)

FOREIGN PATENT DOCUMENTS

| | | |
|---|---|---|
| EP | 1900984 | 11/2009 |
| EP | 1636519 | 9/2010 |

(Continued)

*Primary Examiner* — Robert K Arundale
(74) *Attorney, Agent, or Firm* — Kim IP Law Group LLC

(57) ABSTRACT

A gate valve for controlling flow of a fluid therethrough is provided. The gate valve includes a valve body having an outer surface, a bore, a valve cavity, a first seat pocket, a second seat pocket, and first and second fluid ports extending from the outer surface to the first and second seat pockets, respectively. First and second seats are positioned respectively within the first and second seat pockets. The seats include circumferential fluid channels and one or more conduits in fluid communication with the fluid ports for permitting a repair fluid to be injected into the ports to the faces of the seats. A gate is slidably positioned within the valve cavity between the first seat and the second seat for controlling flow of a fluid through the valve. Sand shields are also provided at the rear of the seats to capture particulates and to bias the seats against the gate.

20 Claims, 22 Drawing Sheets

(56) References Cited

U.S. PATENT DOCUMENTS

| | | | | |
|---|---|---|---|---|
| 3,696,831 | A * | 10/1972 | Fowler | F16K 3/36 137/246.12 |
| 3,827,673 | A * | 8/1974 | Houlgrave | F16K 3/0227 251/360 |
| RE29,299 | E * | 7/1977 | Estes | F16K 3/36 137/246.22 |
| 4,067,542 | A | 1/1978 | Morrison | |
| 4,095,612 | A * | 6/1978 | Hardcastle | F16K 3/0227 137/246.22 |
| 4,272,055 | A * | 6/1981 | Herd | F16K 41/14 251/214 |
| 4,281,819 | A | 8/1981 | Linder | |
| 4,566,671 | A | 1/1986 | Beson | |
| 4,971,098 | A | 11/1990 | Stroud | |
| 5,037,064 | A | 8/1991 | Pond | |
| 5,062,439 | A | 11/1991 | Batson et al. | |
| 5,341,835 | A * | 8/1994 | Lanning, II | F16K 3/0227 137/246.22 |
| 5,727,775 | A | 3/1998 | Rodger et al. | |
| 6,158,718 | A | 12/2000 | Lang et al. | |
| 6,279,875 | B1 | 8/2001 | Chatufale | |
| 6,401,747 | B1 | 6/2002 | Cain et al. | |
| 6,422,535 | B1 | 7/2002 | Dole et al. | |
| 6,453,944 | B2 | 9/2002 | Bartlett | |
| 6,918,574 | B2 | 7/2005 | Hallden et al. | |
| 6,929,244 | B1 | 8/2005 | Comeaux et al. | |
| 6,942,194 | B2 | 9/2005 | Birkeland et al. | |
| 6,959,912 | B2 | 11/2005 | Vanderberg et al. | |
| 7,004,452 | B2 | 2/2006 | Chatufale | |
| 7,059,586 | B2 | 6/2006 | Vanderberg et al. | |
| 7,066,444 | B2 | 6/2006 | Zheng | |
| 7,255,328 | B2 | 8/2007 | Hunter | |
| 7,306,201 | B2 | 12/2007 | Lam | |
| 7,350,766 | B2 | 4/2008 | Powell et al. | |
| 7,780,143 | B2 | 8/2010 | Horie et al. | |
| 7,819,378 | B2 | 10/2010 | Jennings | |
| 7,946,556 | B1 | 5/2011 | Trott | |
| 7,975,984 | B1 | 7/2011 | Kurbanov et al. | |
| 8,074,967 | B2 | 12/2011 | Tsuji | |
| 8,302,630 | B2 | 11/2012 | Palmer | |
| 8,327,866 | B2 | 12/2012 | Parks, Jr. | |
| 8,365,760 | B2 | 2/2013 | Hans | |
| 8,403,296 | B2 | 3/2013 | Phillips | |
| 8,403,298 | B2 | 3/2013 | Nguyen | |
| 8,499,783 | B2 | 8/2013 | Woodward | |
| 8,590,861 | B2 | 11/2013 | Nose et al. | |
| 8,627,843 | B2 | 1/2014 | Ries | |
| 8,662,473 | B2 | 3/2014 | Comeaux | |
| 8,672,295 | B2 | 3/2014 | Weaver et al. | |
| 8,777,184 | B2 | 7/2014 | Brock | |
| 8,813,771 | B2 | 8/2014 | Rayment et al. | |
| 8,840,085 | B2 | 9/2014 | Baek et al. | |
| 8,888,106 | B2 | 11/2014 | Yoshida et al. | |
| 8,973,897 | B2 | 3/2015 | Cordova et al. | |
| 9,010,725 | B2 | 4/2015 | Hunter | |
| 9,032,781 | B2 | 5/2015 | Clark et al. | |
| 9,080,675 | B2 | 7/2015 | Wodara et al. | |
| 9,086,165 | B2 | 7/2015 | Tadokoro et al. | |
| 9,091,351 | B2 | 7/2015 | Jones et al. | |
| 9,140,368 | B2 | 9/2015 | Brandt et al. | |
| 9,206,910 | B2 | 12/2015 | Bonner et al. | |
| 9,233,497 | B2 | 1/2016 | Kawahara et al. | |
| 9,249,888 | B2 | 2/2016 | McEvoy et al. | |
| 9,303,808 | B2 | 4/2016 | Griffin et al. | |
| 9,347,585 | B2 | 5/2016 | Adams et al. | |
| 9,353,871 | B2 | 5/2016 | Hoang et al. | |
| 9,395,002 | B2 | 7/2016 | McEvoy et al. | |
| 9,447,697 | B2 | 9/2016 | Markyvech et al. | |
| 9,470,057 | B2 | 10/2016 | Lundheim et al. | |
| 9,611,940 | B2 | 4/2017 | Yoshida et al. | |
| 9,644,779 | B2 | 5/2017 | Mastny et al. | |
| 9,664,292 | B2 | 5/2017 | Mosman | |
| 9,739,377 | B2 | 8/2017 | Weidgang et al. | |
| 9,759,333 | B2 | 9/2017 | Mori et al. | |
| 9,759,334 | B2 | 9/2017 | Kahn et al. | |
| 9,845,897 | B2 | 12/2017 | Cherewyk | |
| 9,885,420 | B2 | 2/2018 | Sundararajan | |
| 9,970,553 | B2 | 5/2018 | Hawa | |
| 10,060,548 | B1 | 8/2018 | Oak | |
| 10,077,844 | B2 | 9/2018 | Parks, Jr. | |
| 10,088,060 | B2 | 10/2018 | Sundrla | |
| 2005/0067599 | A1 * | 3/2005 | Chatufale | F16K 3/0227 251/171 |
| 2013/0119288 | A1 | 5/2013 | Shaw | |
| 2014/0021397 | A1 | 1/2014 | Painter | |
| 2014/0034861 | A1 | 2/2014 | Scattini | |
| 2015/0060715 | A1 | 3/2015 | Hoang | |
| 2016/0265588 | A1 | 9/2016 | Devitt | |
| 2016/0312905 | A1 | 10/2016 | Gradle | |
| 2016/0327165 | A1 * | 11/2016 | Sundararajan | F16J 15/3236 |
| 2017/0037977 | A1 | 2/2017 | Surprenant | |
| 2017/0102078 | A1 | 4/2017 | Deocampo | |
| 2017/0241551 | A1 | 8/2017 | Nygard | |
| 2017/0299067 | A1 | 10/2017 | Nyhammer | |
| 2018/0087673 | A1 | 3/2018 | Saini et al. | |
| 2018/0238456 | A1 | 8/2018 | Farquharson et al. | |

FOREIGN PATENT DOCUMENTS

| | | |
|---|---|---|
| EP | 2345831 | 7/2011 |
| EP | 2366920 | 9/2011 |
| EP | 2743550 | 6/2014 |
| WO | 2015/173320 A1 | 11/2015 |
| WO | 2017/124192 A1 | 7/2017 |
| WO | 2017/158077 A1 | 9/2017 |
| WO | 2017/173492 A1 | 10/2017 |
| WO | 2018/096312 A1 | 5/2018 |
| WO | 2018/123618 A1 | 7/2018 |

* cited by examiner

GATE VALVE AND METHOD OF REPAIRING SAME

CROSS-REFERENCE

The present application claims the benefit of provisional patent application No. 62/796,531 entitled "GATE VALVE," filed on Jan. 24, 2019, the entire contents of which are expressly incorporated herein by reference.

FIELD OF INVENTION

The present invention relates to gate valves, such as gate valves used in the fracking industry and for other purposes.

BACKGROUND OF THE INVENTION

Hydraulic fracturing (or "fracking") is a safe and effective technology for extracting oil or natural gas from rock formations deep underground (such as from shale, coal beds, sandstone and limestone). The process begins with the drilling of a bore through a well-head to an appropriate depth at which a target rock formation is situated. Next, horizontal drilling (also known as directional drilling) is used to extend the bore horizontally into or above the target rock formation. The drill is then removed, after which the bore is cased with a continuous steel pipe maintained in place using cement or other means. A perforation gun is then lowered into the bore. The perforation gun includes shaped explosives which, when detonated, form one or more extended holes through the walls of the steel pipe and into the target rock formation. The perforation gun is then removed, after which a fracking fluid is injected into the pipe under high pressure. The fracking fluid consists primarily of water, as well as proppant particles (e.g., gritty sand or small ceramic spheres) and other fracking chemicals, such as lubricating and gelling agents. When injected, the fracking fluid flows through the pipe and into the holes within the target rock formation, at which proppant particles within the fluid become lodged between the walls of the holes. The fracking fluid is then drained from the steel pipe, leaving behind the lodged proppant particles which hold the holes open to permit oil or gas trapped within the target rock formation to flow into the steel pipe. The oil or gas is then extracted from the steel pipe through the well-head.

Specialized equipment situated at the well-head (known as a "frac-stack") is used to effectuate the various steps of the fracking process. For instance, one or more bi-directional gate valves, together with other equipment, allow for controlled injection, containment and removal of high-pressure fracking fluid, as well as removal of oil or gas from the steel pipe.

A typical bi-directional gate valve 100 is depicted in FIGS. 1a through 1e. Gate valve 100 includes a valve body 105 provided with a bore 110 through which fracking fluid, oil and/or gas may flow (referred to collectively as "fluid 102"), connection holes 112 for connecting to pipe (not shown) in a known manner, a valve cavity 125, seat pockets 140a, 140b and seats 135a, 135b positioned respectively within seat pockets 140a, 140b. A bonnet 145 having a longitudinal bore 170 is coupled to the top of valve body 105 via nuts 150. Positioned rotatably within bore 170 of bonnet 145 is a valve stem 155 rigidly coupled at its upper end to a hand wheel 175 via a stem adapter 180. Valve stem 155 is surrounded by a packing gland 160 threaded into bonnet 145 to maintain within bore 170 a packing material 165 for preventing fluid 102 from flowing upwardly through bore 170 and toward the top of valve stem 155. Stem adapter 180 and bearings (not shown) are kept in place within bore 170 of bonnet 145 via a cap 185, which also serves as a weather shield.

Flow of fluid 109 through bore 110 of gate valve 100 is controlled via a gate 115 slidably positioned within a valve cavity 125. A top portion of gate 115 is provided with a blind threaded bore 195 screwably engaged with screw threads 197 of valve stem 155 to permit vertical movement of gate 115 within valve cavity 125 (either upwardly or downwardly) upon rotation of valve stem 155 along a selected rotational direction. More specifically, hand wheel 175 (with rigidly attached valve stem 155) may be rotationally operated to selectively position gate 115 into an open position at which a through-hole 120 of gate 115 is aligned with bore 110 to permit flow of fluid 102 (see FIGS. 1a and 1c) or a closed position, at which flow of fluid 102 through bore 110 is blocked by a faces 130a, 130b of gate 115 (see FIGS. 1b and 1d).

When gate 115 of gate valve 100 is in an open position, fluid 102 flows unimpeded from bore section 110b to bore section 110a via through-hole 120 of gate 115 (see FIG. 1c). When hand wheel 175 is operated to position gate 115 into the closed position, faces 130a, 130b of gate 115 block flow through bore 110, thereby causing pressure to build within bore section 110b until reaching a steady-state pressure (see FIG. 1d). This pressure biases gate 115 against seat 135a which, in turn and due in part to loose tolerances in design of gate 115 and seats 135a, 135b, causes a small pathway 182 a few thousandths of an inch thick to form at a gate/seat boundary 198b between gate 115 and seat 135b (see FIG. 1d; width of pathway 182 is shown exaggerated for illustrative purposes only). Pathway 182 allows fluid 102 to flow from bore section 110b into valve cavity 125, where it is stopped from flowing into bore section 110a by the seal at gate/seat boundary 198a between gate 115 and seat 135a. Flow of fluid 102 in the opposite direction through gate valve 100 may be controlled in a manner similar to that described above.

Since fluid 102 is maintained within gate valve 100 under extremely high pressures, proppant particles are sometimes forced into gate/seat boundary 198a between gate 115 and seat 135a when gate 115 is in the closed position, thereby causing erosion and/or scratching of gate 115 and/or seat 135a. This erosion is exacerbated over time, as opening and closing gate valve 100 causes gate 115 to drag the proppant particles along gate/seat boundary 198a, causing further scratching. As shown in FIG. 1e, the erosion and/or scratching may eventually create pathways at gate/seat boundary 198a that permit fluid 102 and its constituent particles to flow disadvantageously from bore section 110b into bore section 110a while gate 115 is in the closed position. Such erosion and scratching is extremely difficult to repair while gate valve 100 is operating, and oftentimes requires the cessation of fracking or other operations at great cost to permit removal and repair of gate valve 100.

Furthermore, since gate 115 may be biased against only one seat 135a, 135b at a time when gate 115 is in the closed position, depending on the direction of pressure flow through bore 110, pressurized fluid 102 may be maintained by gate valve 100 on only one side of gate 115 at any given time, as bi-directional pressures may cause gate 115 to lift off and float between seats 135a and 135b. This, in turn, may cause a fluid path to form disadvantageously between bore sections 110a and 110b while gate 115 is in the closed position.

There is a need in the art for a gate valve that addresses these and other disadvantages.

SUMMARY OF THE INVENTION

In accordance with various embodiments described below and other embodiments, various inventive gate valves are provided. The gate valves simultaneously maintain bi-directional fluid pressures and/or permit for repair of erosion and/or scratches at gate/seat boundaries while the gate valves are in operation and without need for cessation of fracking or other operations.

In accordance with one embodiment of the present invention, a gate valve for controlling flow of a fluid therethrough is provided. The gate valve includes a valve body having a bore, an outer surface, an upper end, a valve cavity, a first seat pocket, a second seat pocket, a first fluid port extending from the outer surface to the first seat pocket, and a second fluid port extending from the outer surface to the second seat pocket; a first seat having a first seat face, a first outside surface, a first circumferential fluid channel provided on the first outside surface, at least one first conduit between the first circumferential fluid channel and the first seat face, the first seat being positioned within the first seat pocket of the valve body, the first fluid port being in fluid communication with the first circumferential fluid channel of the first seat; a second seat having a second seat face, a second outside surface, a second circumferential fluid channel provided on the second outside surface, at least one second conduit between the second circumferential fluid channel and the second seat face, the second seat being positioned within the second seat pocket of the valve body, the second fluid port being in fluid communication with the second circumferential fluid channel of the second seat; a bonnet coupled to the upper end of the valve body; a valve stem having a top end and a bottom end, the valve stem being rotatably positioned within the bonnet; a hand wheel coupled to the top end of the valve stem; a gate screwably coupled to the bottom end of the valve stem, the gate having a first surface and a second surface, the gate slidably positioned within the valve cavity between the first seat face of the first seat and the second seat face of the second seat, the gate configured to be selectively positioned into an open position for permitting flow of the fluid through the bore and a closed position for preventing flow of the fluid through the bore; a first sand shield under compression positioned between a first rear surface of the first seat and a first side wall of the first seat pocket, the first sand shield biasing the first seat against the first surface of the gate; a second sand shield under compression positioned between a second rear surface of the second seat and a second side wall of the second seat pocket, the second sand shield biasing the second seat against the second surface of the gate; a first seal positioned within the first seat pocket; a second seal positioned within the first seat pocket, the first circumferential fluid channel being between the first and second seals; a third seal positioned within the second seat pocket; and a fourth seal positioned within the second seat pocket, the second circumferential fluid channel being between the third and fourth seals.

In accordance with another embodiment of the present invention, the first and second sand shields are each provided with a plurality of protrusions structured to bias radially when under pressure exerted by the fluid.

In accordance with yet another embodiment of the present invention, at least one of the first seal, the second seal, the third seal, and the fourth seal includes a seal ring, an energizing spring for biasing the seal ring radially outwardly into a sealing position, a standoff to provide support for the seal ring, and a back ring to provide an interface contact.

In accordance with still another embodiment of the present invention, the at least one first conduit includes four first conduits.

In accordance with yet another embodiment of the present invention, the at least one second conduit includes four second conduits.

In accordance with still another embodiment of the present invention, each of the first and second fluid ports of the valve body is provided with a standard grease fitting at the outer surface of the valve body.

In accordance with yet another embodiment of the present invention, the first seat face of the first seat is provided with a first face channel in fluid communication with the at least one first conduit, and the second seat face of the second seat is provided with a second seat channel in fluid communication with the at least one second conduit.

In accordance with still another embodiment of the present invention, a method of repairing scratches or erosion in a gate valve is provided. The method includes obtaining a gate valve having a valve body having a bore, an outer surface, an upper end structured to couple to a bonnet, a valve cavity, a first seat pocket, a second seat pocket, a first fluid port extending from the outer surface to the first seat pocket, and a second fluid port extending from the outer surface to the second seat pocket, a first seat positioned within the first seat pocket, the first seat having a first seat face and at least one first conduit in fluid communication with the first fluid port and the first seat face, a second seat positioned within the second seat pocket, the second seat having a second seat face and at least one second conduit in fluid communication with the second fluid port and the second seat face, and a gate slidably positioned within the valve cavity between the first seat face of the first seat and the second seat face of the second seat, the gate configured to be selectively positioned into an open position for permitting flow of the fluid through the bore and a closed position for preventing flow of the fluid through the bore; injecting a repair fluid into the first fluid port to repair scratches or erosion at a first gate/seat boundary between the first seat face of the first seat and a first surface of the gate; and injecting the repair fluid into the second fluid port to repair scratches or erosion at a second gate/seat boundary between the second seat face of the second seat and a second surface of the gate.

BRIEF DESCRIPTION OF THE DRAWINGS

The foregoing summary, as well as the following detailed description of preferred embodiments of the invention, will be better understood when read in conjunction with the appended figures. For the purpose of illustrating the invention, there is shown in the figures embodiments which are presently preferred. It should be understood, however, that the invention is not limited to the precise arrangements and instrumentalities shown. In the figures:

FIG. 3b is a sectional view of the inventive seat of FIG. 3a.

FIG. 3c is a top view of the inventive seat of FIG. 3a.

DETAILED DESCRIPTION

Figure 1A:
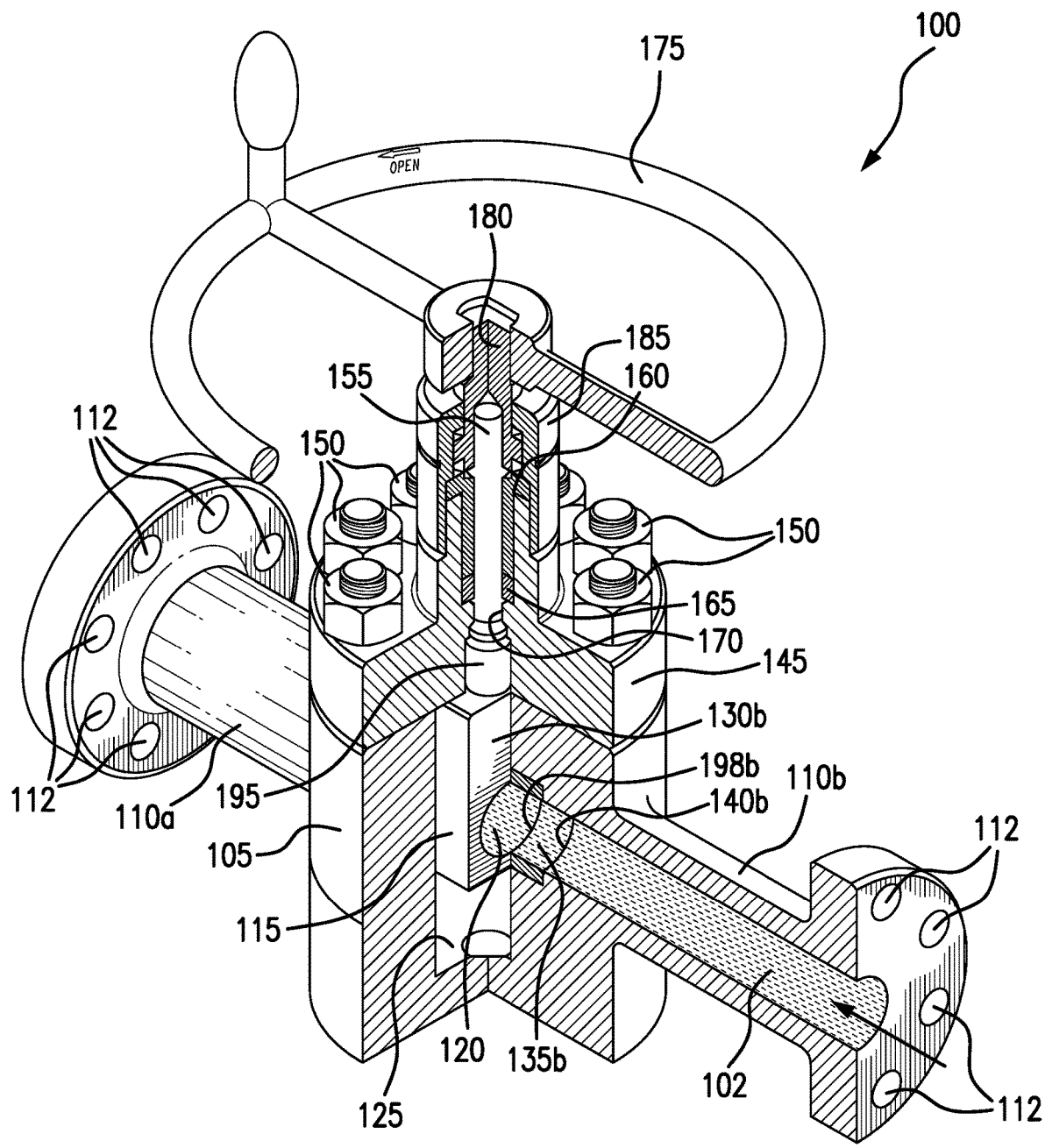
FIG. 1a is a perspective cut-away view of a prior art gate valve in an open position for permitting flow of fluids therethrough.
Figure 1B:
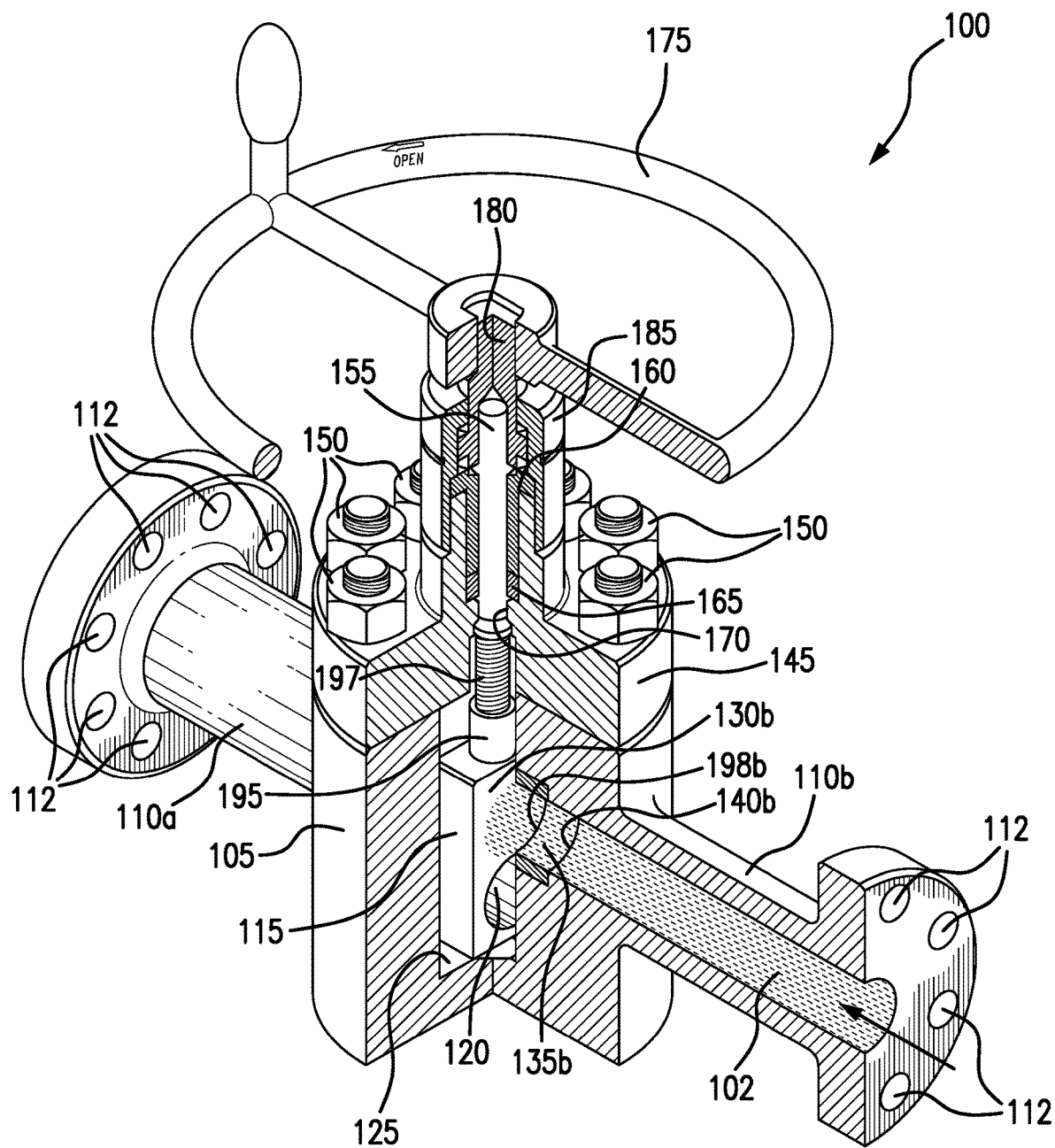
FIG. 1b is a perspective cut-away view of the prior art gate valve depicted in FIG. 1a in a closed position for blocking flow of fluids therethrough.
Figure 1C:
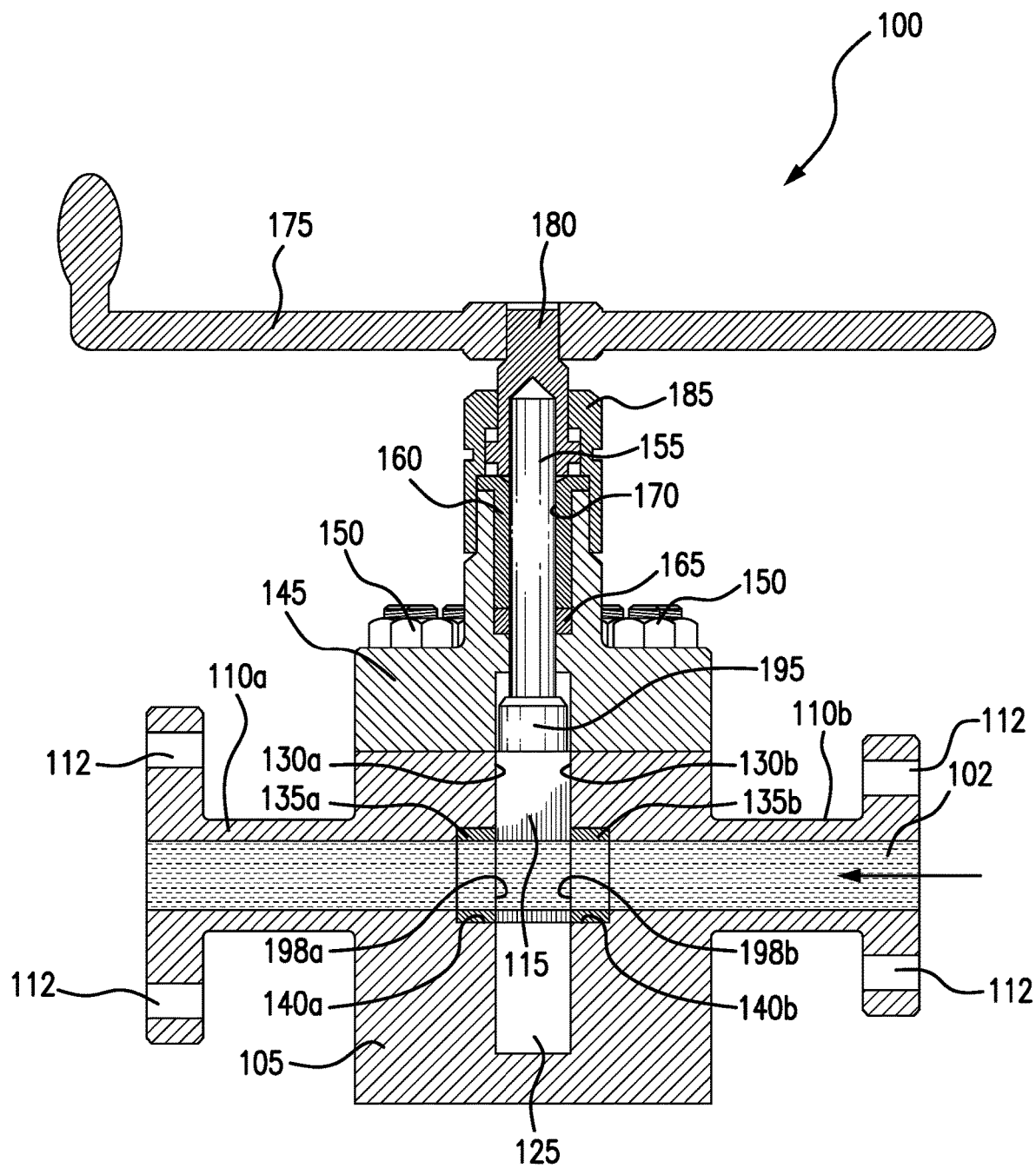
FIG. 1c is a sectional view of the prior art gate valve depicted in FIG. 1a in an open position for permitting flow of fluids therethrough.
Figure 1D:
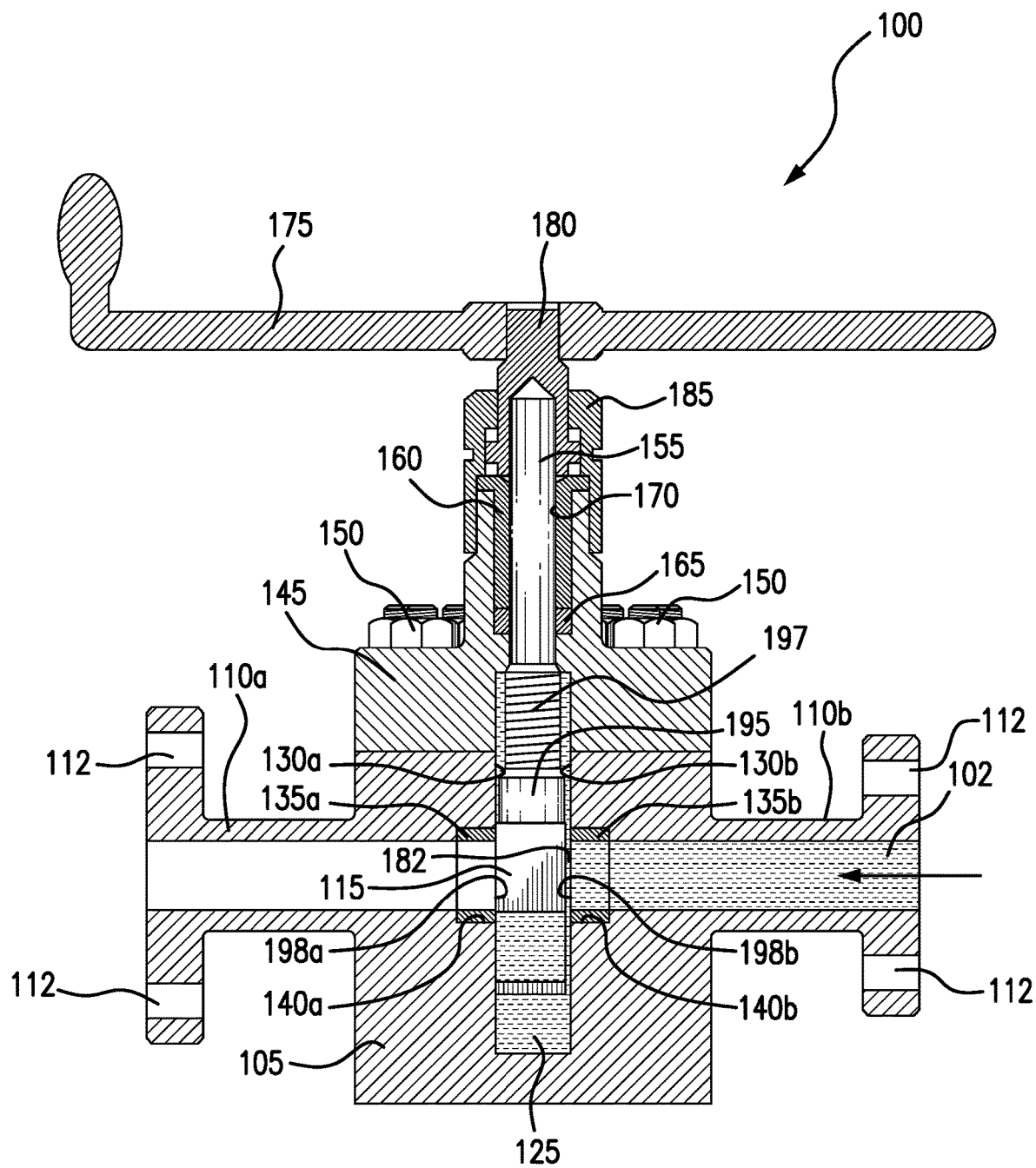
FIG. 1d is a sectional view of the prior art gate valve depicted in FIG. 1a in a closed position for blocking flow of fluids therethrough.
Figure 1E:
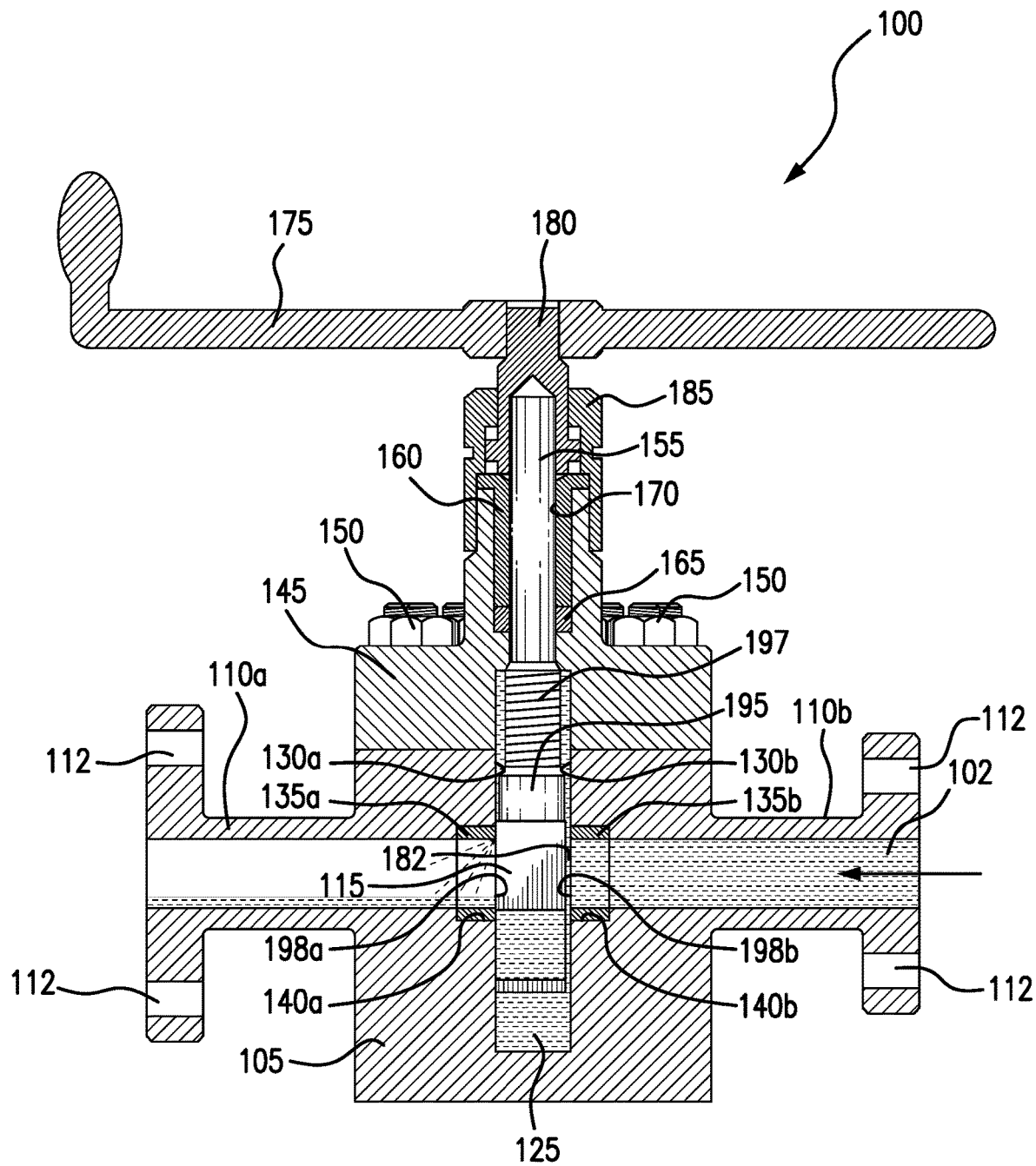
FIG. 1e is a sectional view of the prior art gate valve depicted in FIG. 1a in a closed position and leaking fluid.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Furthermore, the subject application references certain processes which are presented as series of ordered steps. It should be understood that the steps described with respect to those processes are not to be understood as enumerated consecutive lists but could be performed in various orders while still embodying the invention described herein.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a support" may include a plurality of supports. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Figure 2A:
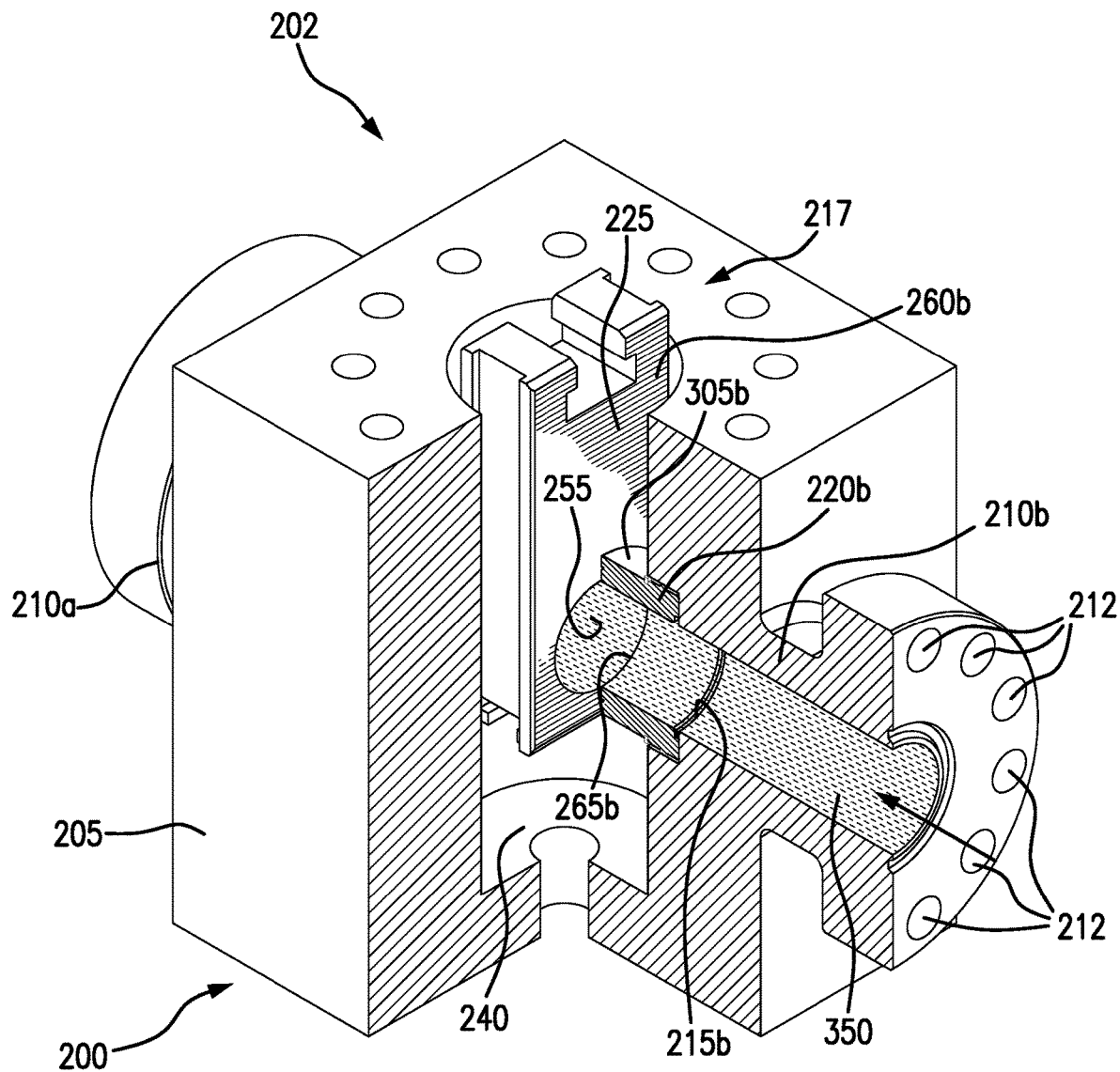
FIG. 2a is a perspective cut-away view of a gate valve according to the present invention in an open position for permitting flow of fluids therethrough.
Figure 2B:
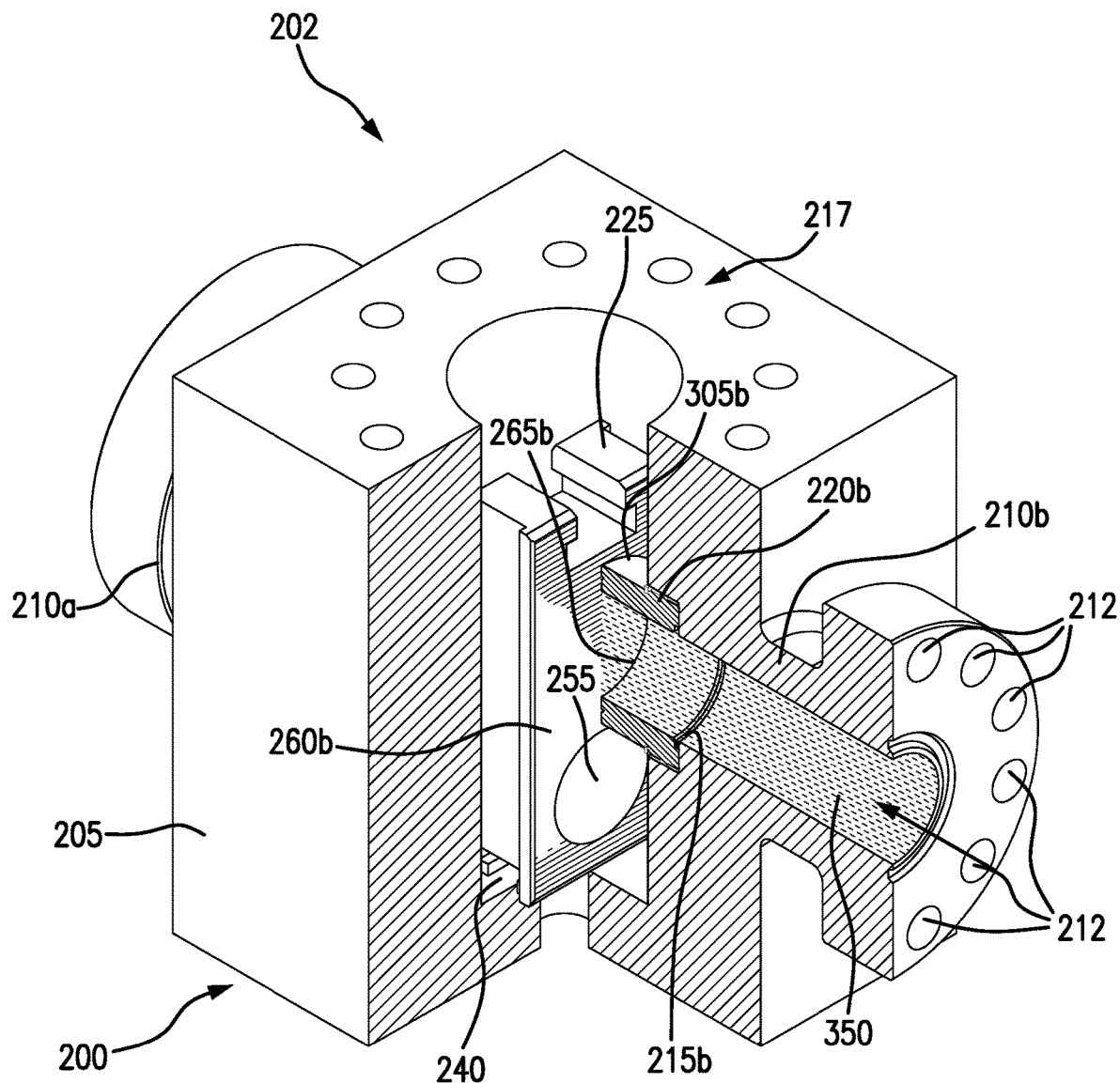
FIG. 2b is a perspective cut-away view of the inventive gate valve depicted in FIG. 2a in a closed position for blocking flow of fluids therethrough.
Figure 2C:
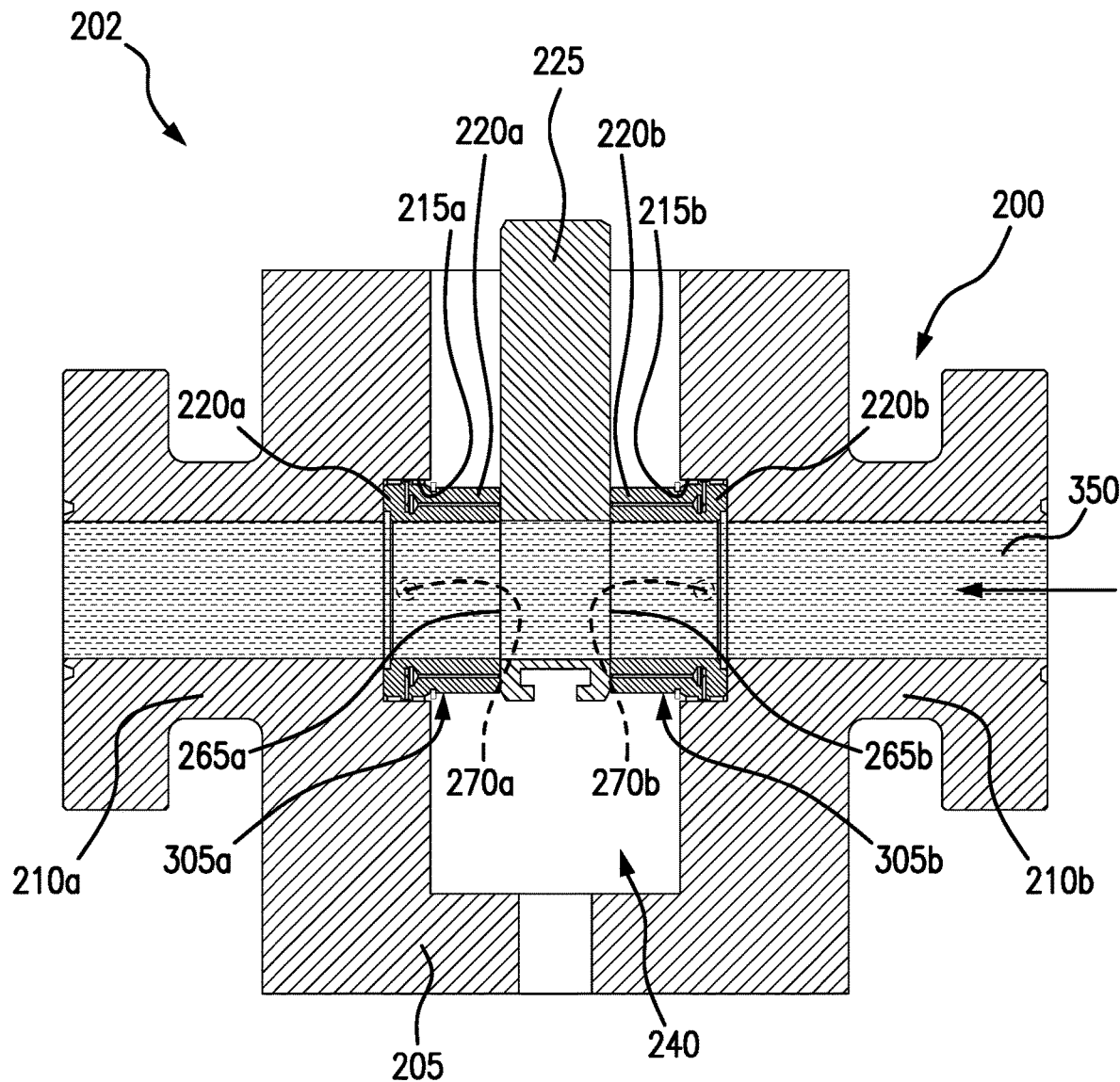
FIG. 2c is a sectional view of the inventive gate valve depicted in FIG. 2a in an open position for permitting flow of fluids therethrough.
Figure 2D:
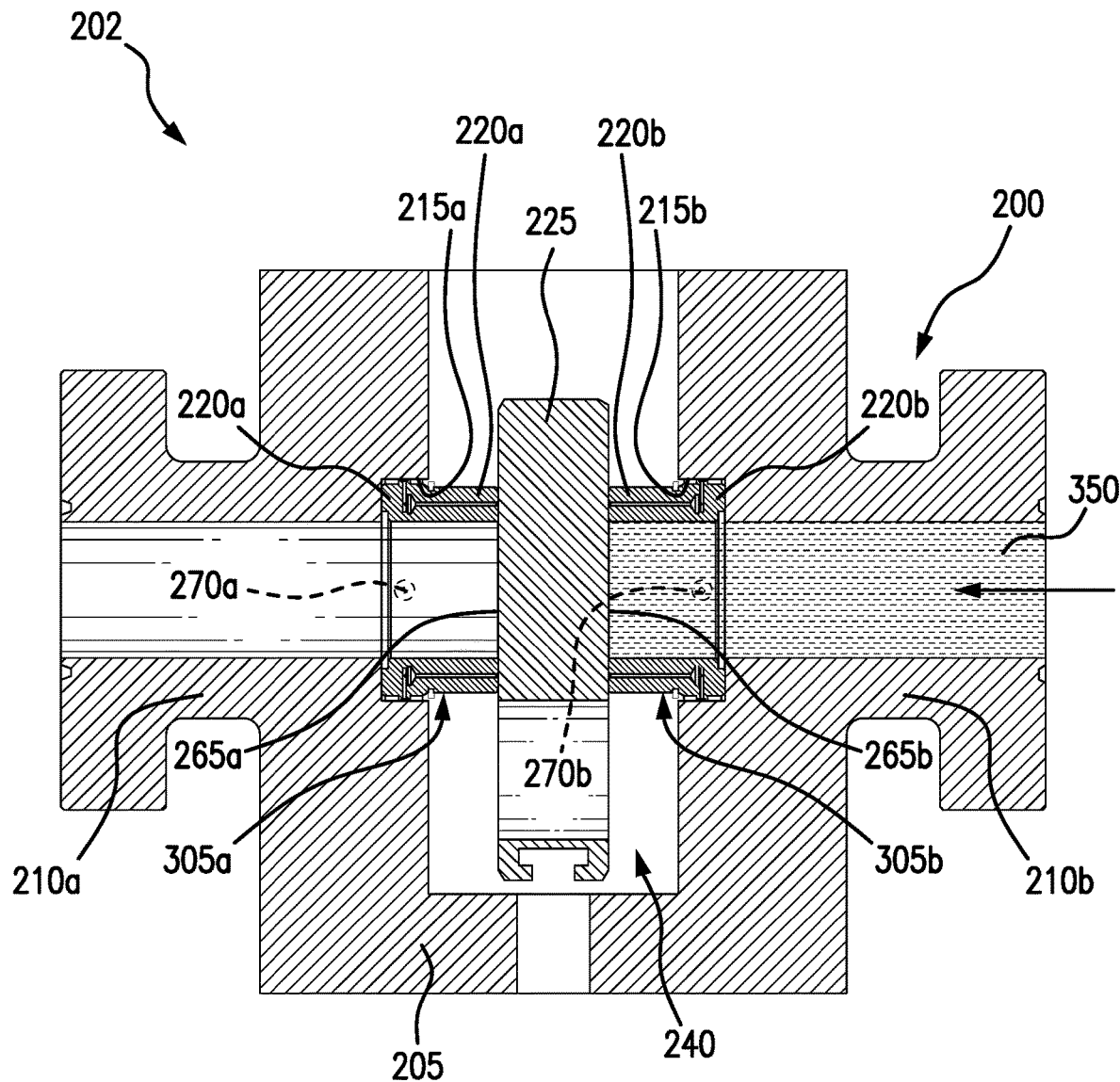
FIG. 2d is a sectional view of the inventive gate valve depicted in FIG. 2a in a closed position for blocking flow of fluids therethrough.
Figure 2E:
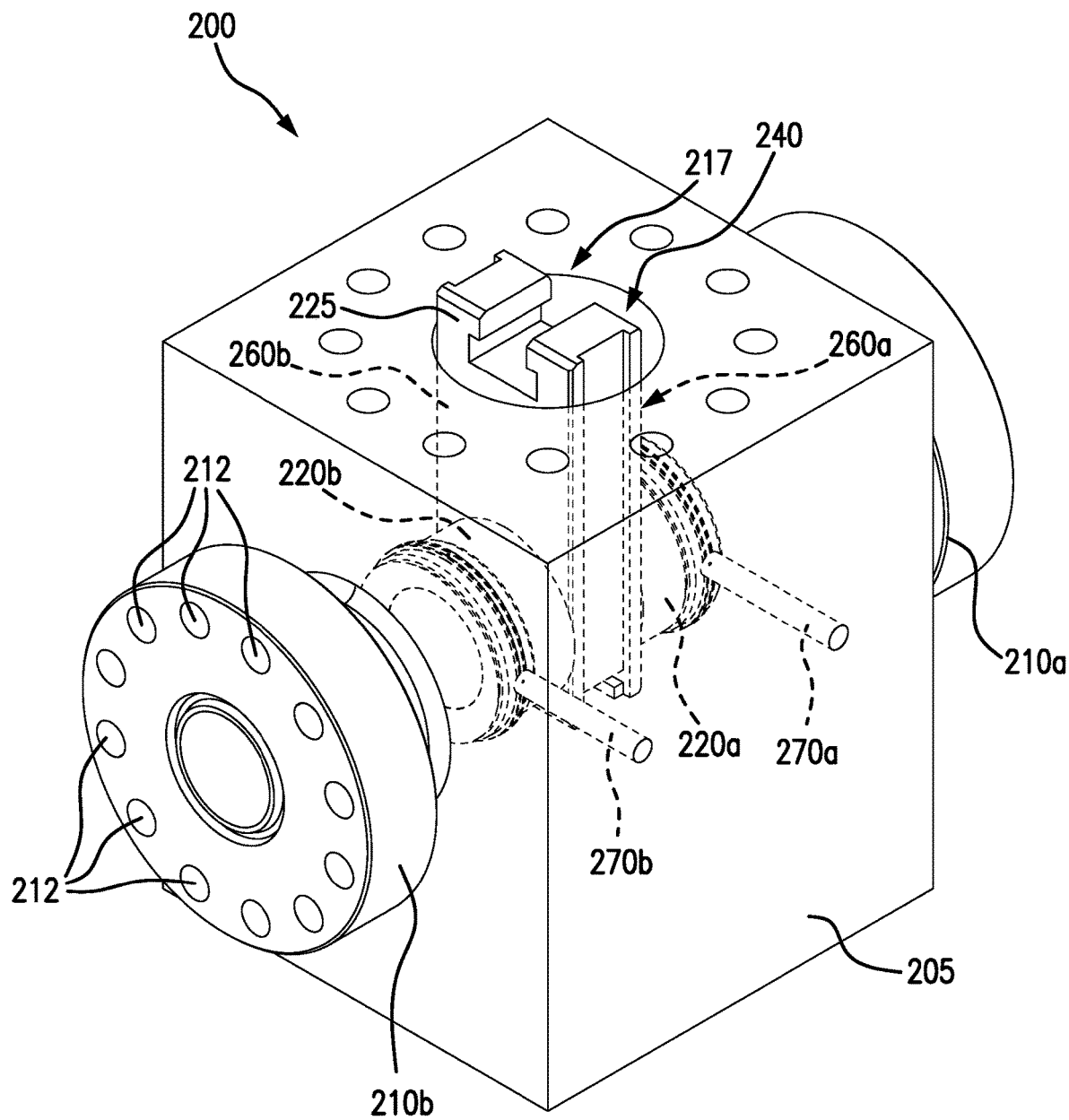
FIG. 2e is a perspective view of the inventive gate valve depicted in FIG. 2a showing fluid ports.

Referring now to FIGS. 2a through 2e, there is seen a valve body assembly 200 of a gate valve 202 according to the present invention. Valve body assembly 200 includes a valve body 205 provided with a bore 210 through which fluids, such as fracking fluid 350, may flow. Valve body 205 also includes connection holes 212 for connecting to pipe (not shown), seat pockets 215a, 215b for receiving respective seats 220a, 220b, and a mating portion 217, which may be configured to couple with a bonnet and valve stem assembly of a standard bi-directional gate valve, such as, for example, bonnet 145 of gate valve 100 described above with respect to FIGS. 1a through 1e. As shown in FIG. 2e, valve body 205 is also provided with two fluid ports 270a, 270b (each of which may include a standard body grease fitting) in respective fluid communication with outside surfaces 305a, 305b of seats 220a, 220b. As more fully described below, fluid ports 270a, 270b are configured to receive a repair fluid for repairing eroded and/or scratched surfaces within valve body assembly 200.

Flow of gas, oil and fracking fluid through valve body 205 is controlled in a manner similar to that described above with respect to gate valve 100 depicted in FIGS. 1a through 1e. More specifically, a gate 225 slidably positioned within a valve cavity 240 of valve body 205 may be selectively positioned into an open position at which a through-hole 255 of gate 225 is aligned with bore 210 to permit flow of fluids, such as fracking fluid 350 (see FIGS. 2a and 2c) or a closed position, at which flow of fracking fluid 350 through bore 210 is blocked by gate 225 (see FIGS. 2b and 2d). While in the closed position, gate 225 forms seals with seats 220a, 220b at respective gate/seat boundaries 265a, 265b.

Figure 3A:
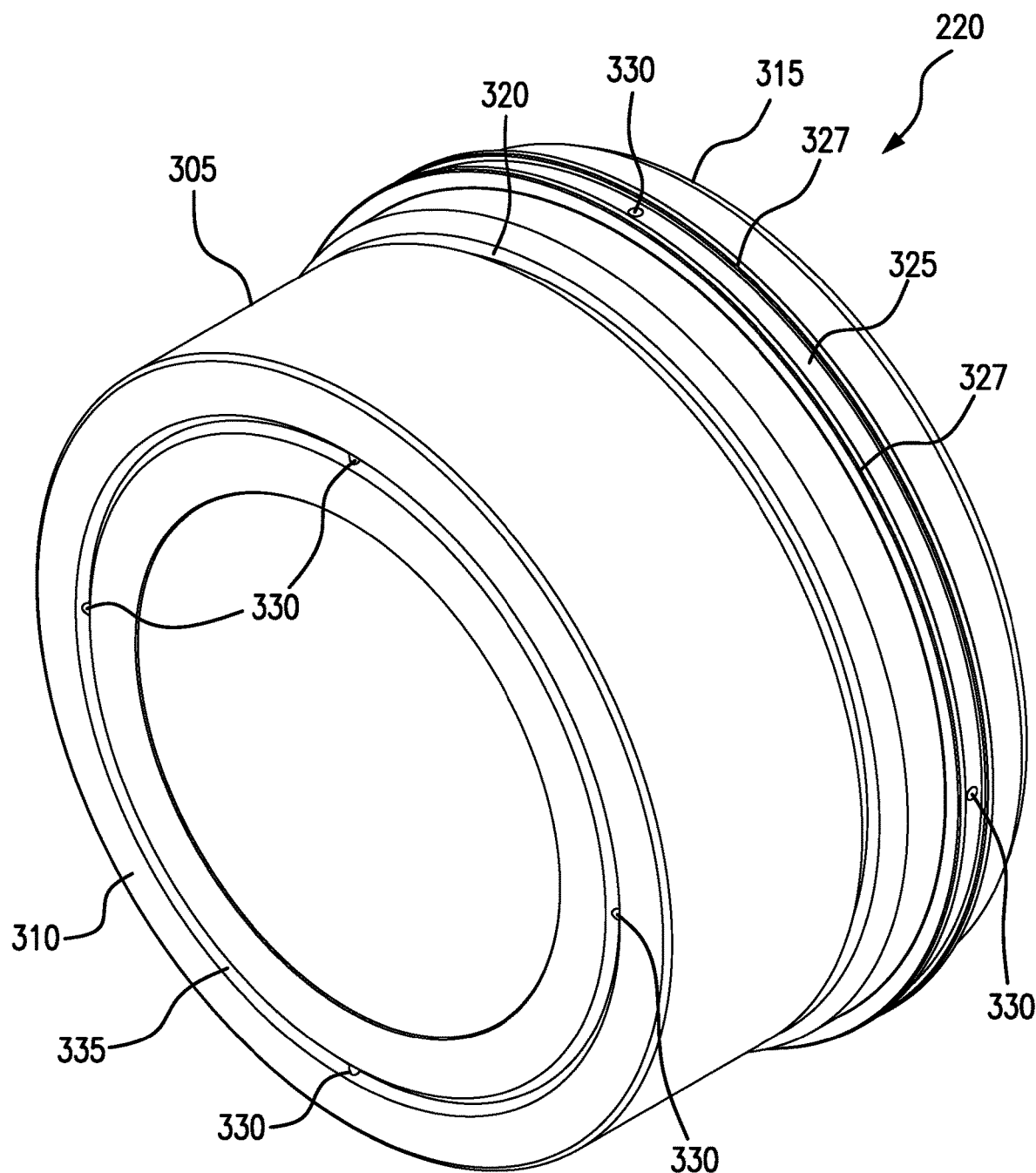
FIG. 3a is a perspective view of a seat according to the present invention.
Figure 3B:
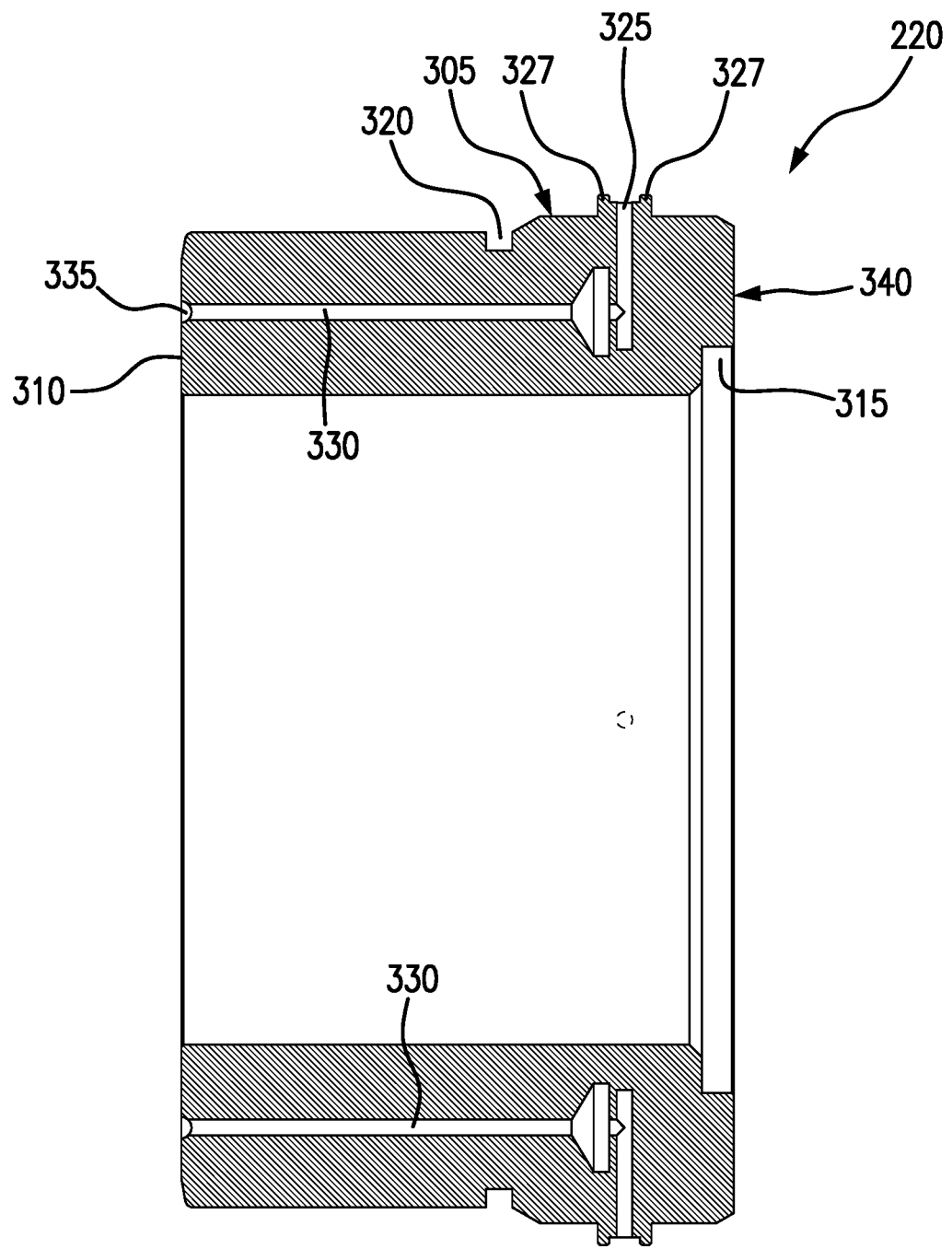
Figure 3C:
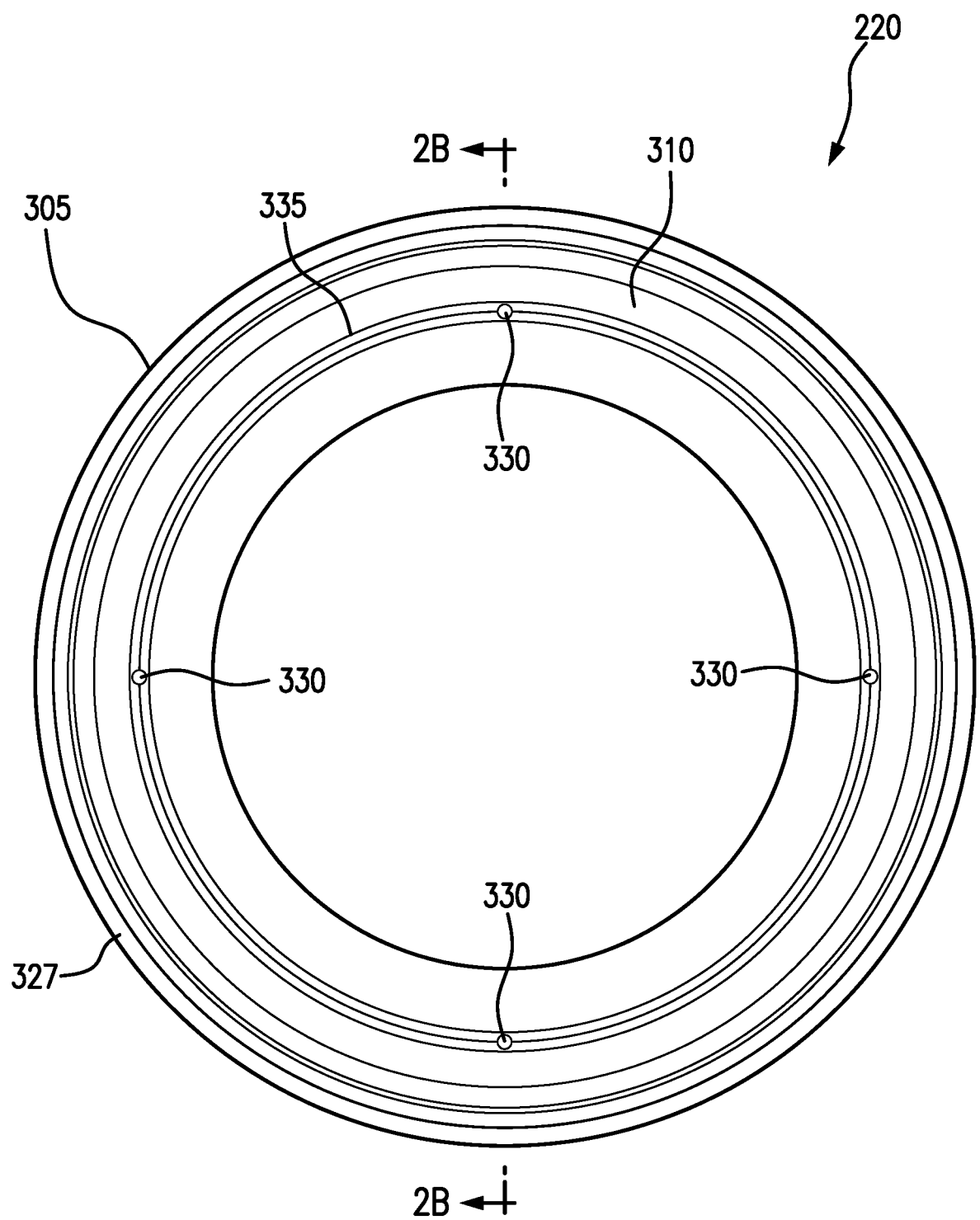

Referring now to FIGS. 3a through 3c, there is seen perspective, cross-sectional, and top views, respectively, of seat 220 according to the present invention. Seat 220 includes an outside surface 305 for receipt and interface within seat pocket 215 of valve body 205. Seat 220 also includes a seat face 310 for interfacing with gate 225 at gate/seat boundary 265, a shield pocket 315 for receipt of a sand shield under compression (see below) and a circumferential retaining groove 320 for receipt of a retaining ring (see below). Outside surface 305 of seat 220 is also provided with two lips 327 enclosing a circumferential fluid channel 325, from which extend four circumferentially spaced fluid conduits 330 that terminate at a circular face channel 335 provided on seat face 310. It should be appreciated that alternative embodiments may include a different number of fluid conduits 330, and that the present invention as a whole is not intended to be limited to any specific number or type of conduits.

Figure 4A:
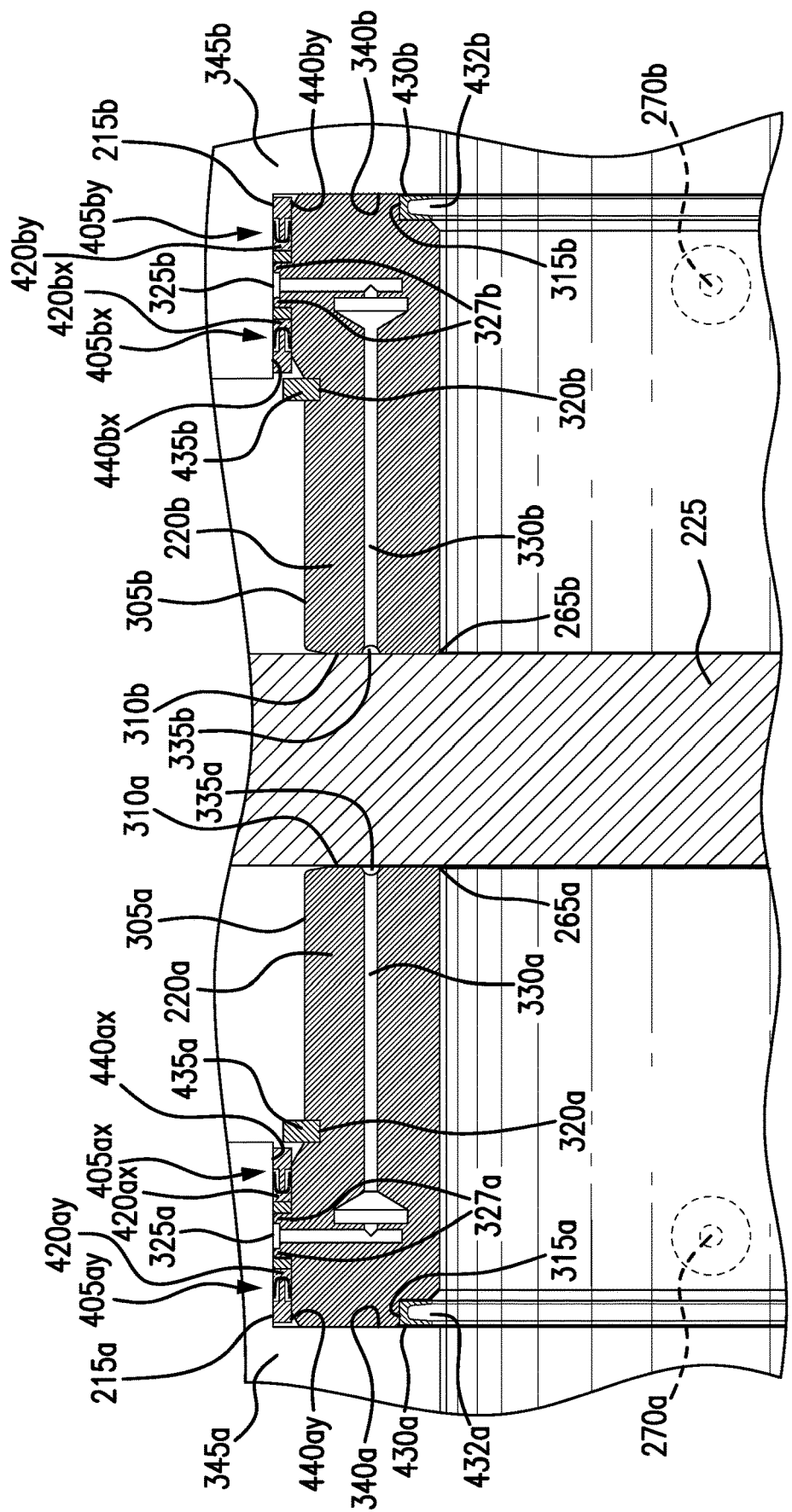
FIG. 4a is a sectional view of seats installed within a valve body according to the present invention.
Figure 4B:
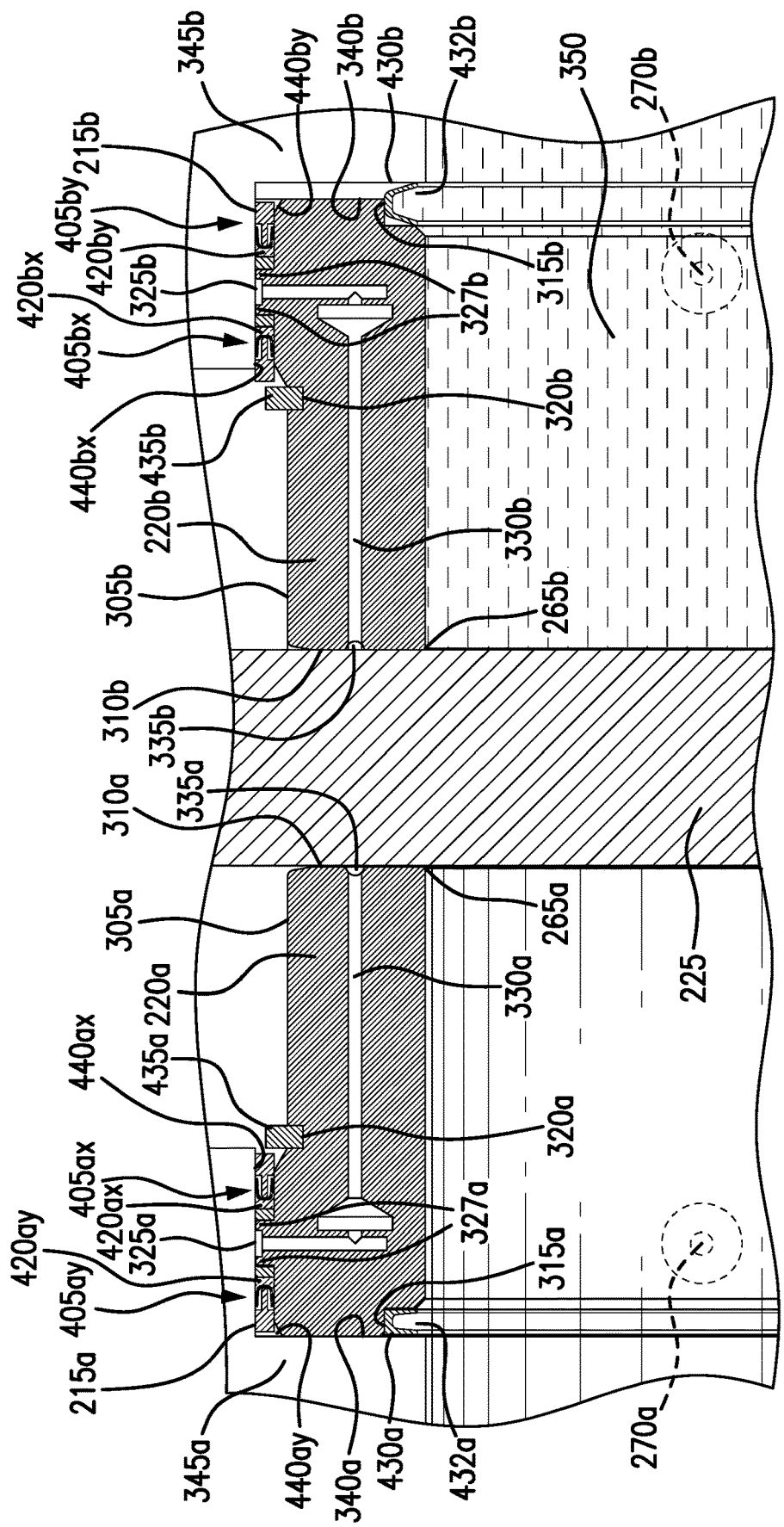
FIG. 4b is a sectional view of seats installed within a valve body with fluid flowing into one side of the valve body, according to the present invention.

Referring now to FIG. 4a, there is seen a cross-sectional view of seats 220a, 220b installed respectively within seat pockets 215a, 215b of valve body 205 (FIG. 4a is described below generically without reference to left "a" or right "b" designations). When installed within seat pocket 215 of valve body 205, fluid port 270 aligns with circumferential fluid channel 325. In this manner, uninterrupted fluid pathways are created from the outside surface of valve body 205 to seat face 310 via fluid port 270, circumferential fluid channel 325, fluid conduits 330, and circular face channel 335. Seals 405x, 405y are positioned respectively within seal cavities 440x, 440y for forming a fluid-tight seal between seat pocket 215 and outside surface 305 of seat 220, as well as to help prevent fluid communication between circumferential fluid channel 325 and seal cavities 440x, 440y. As shown in FIG. 4D, seals 405x, 405y include respective seal rings 420x, 420y, energizing springs 415x, 415y for biasing seal rings 420x, 420y radially outwardly into sealing positions, standoffs 410x, 410y to provide support for seals 405x, 405y and back rings 425x, 425y to assist with installation of seals 405x, 405y and to provide interface contacts between seals 405x, 405y and lips 327 of seat 220. An annular sand shield 430 with protrusions 432 under compression is installed within shield pocket 315 to prevent passage of fluids and/or their particulates (such as sand or ceramic proppant particles) from bore 210, between rear surface 340 of seat 220 and side wall 345 of seat pocket 215, and toward seal cavity 440y. An annular retaining ring 435 positioned within retaining groove 320 is also provided for maintaining seal 405x within seal cavity 440x.

Figure 5:
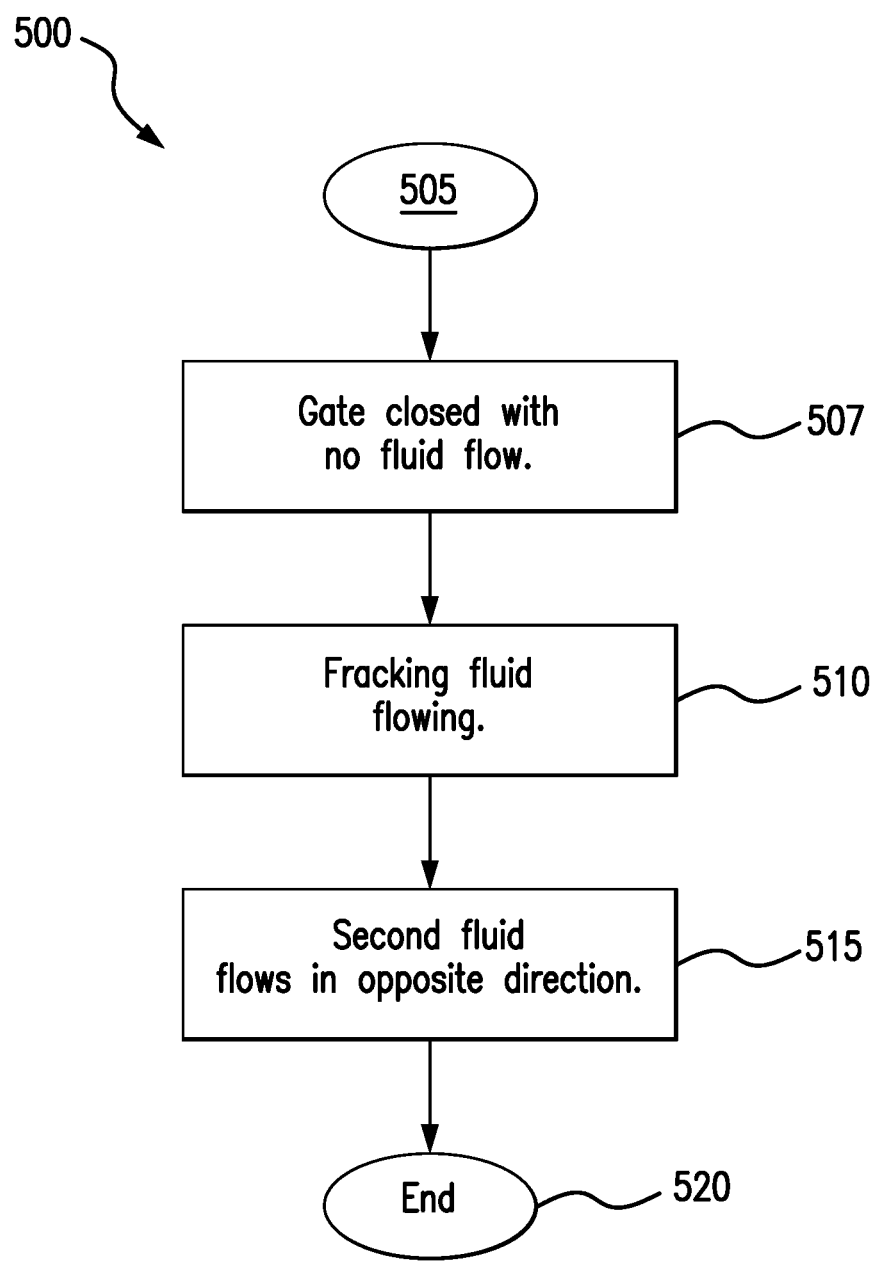
FIG. 5 is a process flow describing operation of a gate valve for maintaining simultaneous, bi-directional pressures, according to the present invention.

Unlike prior art gate valves, gate valve 202 can maintain bi-directional pressures within bore 210 simultaneously and without breakdown in functionality or performance (such as by leakage of fracking fluids 350 from bore 210, along gate/seat boundary 265 and into valve cavity 240). Referring now to FIG. 5, there is seen a process flow 500 describing operation of gate valve 202 for maintaining simultaneous, bi-directional pressures. Process 500 begins at step 505 and proceeds to step 507, at which gate 225 of gate valve 202 is in a closed position and no fluids are flowing through connected pipes toward bore 210 (see FIG. 4a). The process then proceeds to step 510, at which fracking fluid 350 with constituent proppant particles, such as sand and/or ceramic particles, flows under high pressure into bore section 210b (see FIG. 4b).

Since gate 225 is closed at this point, pressure builds within bore section 210b until reaching a steady-state pressure. During or after this pressure rise, pressure within fracking fluid 350 causes protrusions 432b of sand shield 430b to provide additional biasing force radially outwardly against rear surface 340b of seat 220b and side wall 345b of seat pocket 215b to better ensure that fracking fluid 350 does not flow along the boundary between rear surface 340b and side wall 345b. In at least one embodiment, to the extent pressure within fracking fluid 350 is sufficiently high, fracking fluid 350 and accompanying pressure (but not proppant particles, which remain blocked by sand shield 430b) pass along the boundary between rear surface 340b and side wall 345b and into seal cavity 440by, thereby causing a pressure rise within seal cavity 440by due in part to a pressure differential between seal cavities 440bx, 440by, as seal cavity 440bx is devoid of fluid and unpressurized at this point. This pressure combined with the biasing force of protrusions 432b caused by both the initial installation compression of protrusions 432b and pressure of fracking fluid 350 exerted against protrusions 432b biases seat 220b against gate 225, thereby closing a gap at gate/seat boundary 265b that would otherwise form in prior art gate valves (biasing travel distance of seat 220b shown exaggerated in FIG. 4b for illustrative purposes only). This improves the seal between gate 225 and seat 220b at gate/seat boundary 265b and helps ensure that pressurized fracking fluid 350 does not enter valve cavity 240 while gate 225 is in the closed position.

Figure 4C:
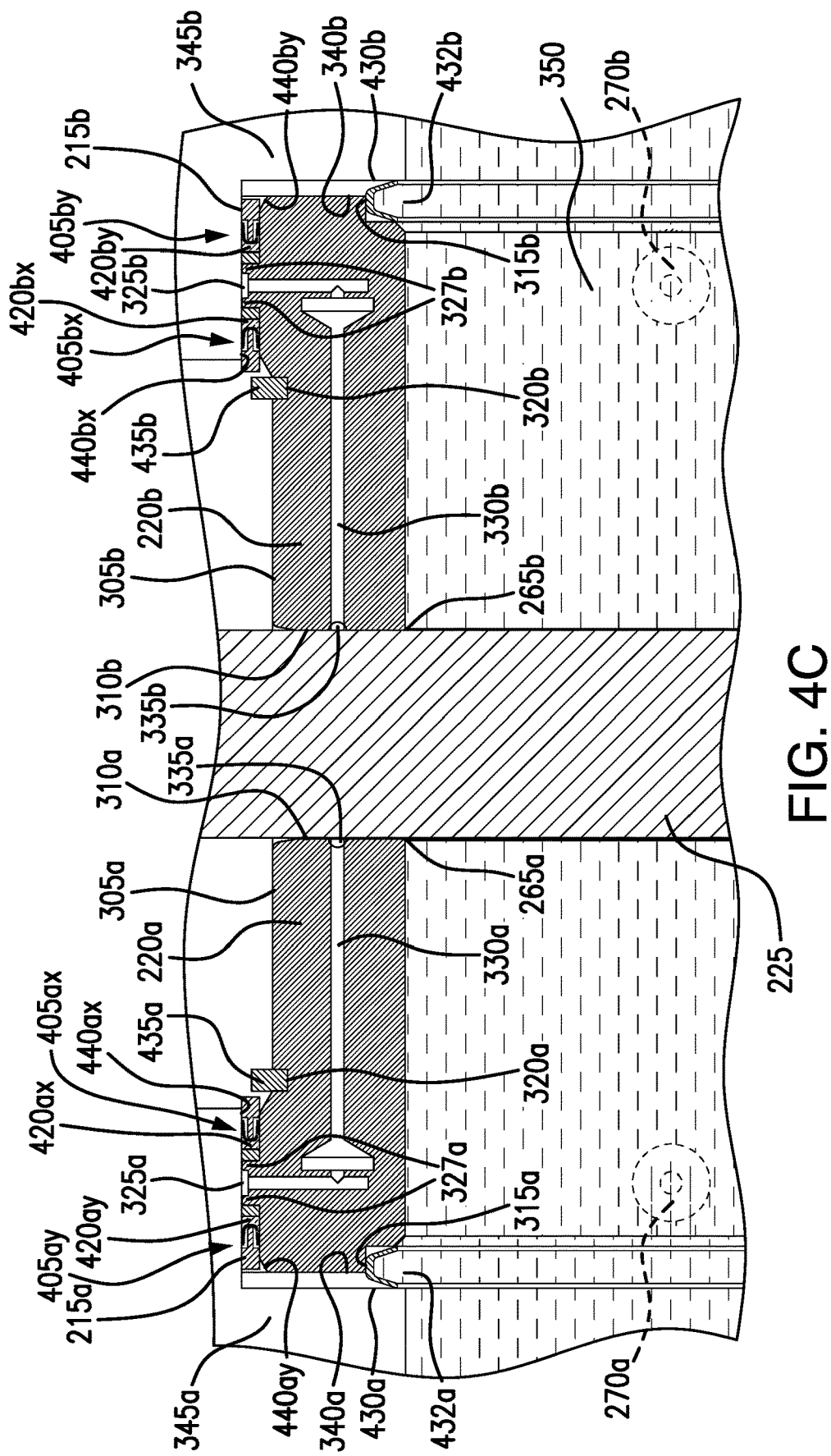
FIG. 4c is a sectional view of seats installed within a valve body with fluid flowing into both sides of the valve body, according to the present invention.
Figure 4D:
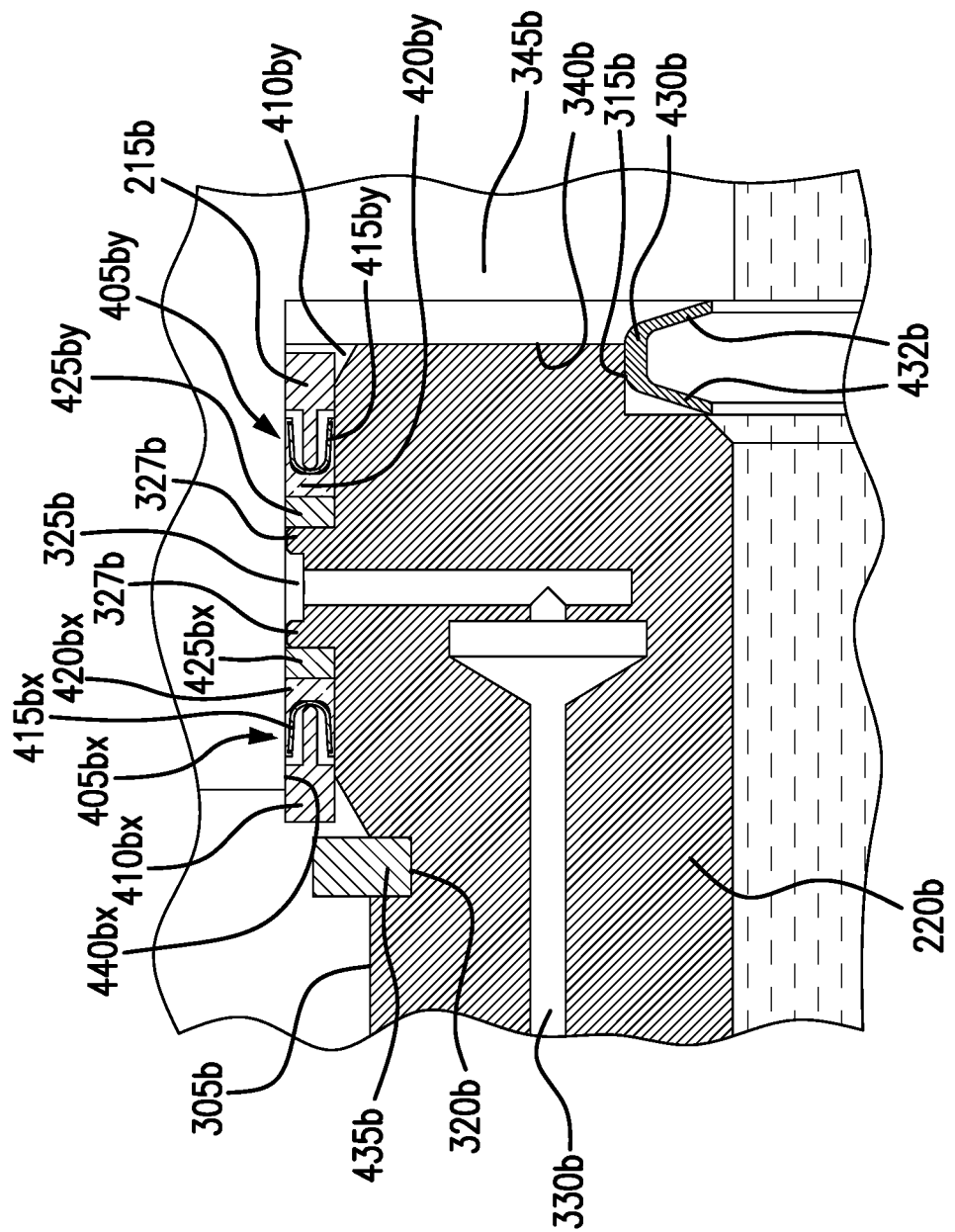
FIG. 4d is a close-up sectional view of a seat installed within a valve body, according to the present invention

The process then proceeds to step 515, at which another fluid 352 flows under high pressure into bore section 210a (see FIG. 4c). Since gate 225 remains closed at this point, pressure builds within bore section 210a until reaching a steady-state pressure. During or after this pressure rise, pressure within fluid 352 causes protrusions 432a of sand shield 430a to provide additional biasing force radially outwardly against rear surface 340a of seat 220a and side wall 345a of seat pocket 215a to better ensure that fluid 352 does not flow along the boundary between rear surface 340a and side wall 345a. In at least one embodiment, to the extent pressure within fracking fluid 352 is sufficiently high, fluid 352 and accompanying pressure (but not constituent components of fluid 352, such as proppant particles, which remain blocked by sand shield 430a) pass along the boundary between rear surface 340a and side wall 345a and into seal cavity 440ay, thereby causing a pressure rise within seal cavity 440ay due in part to a pressure differential between seal cavities 440ax, 440ay, as seal cavity 440ax is devoid of fluid and unpressurized at this point. This pressure combined with the biasing force of protrusions 432a caused by both the initial installation compression of protrusions 432a and pressure of fluid 352 exerted against protrusions 432a biases seat 220a against gate 225, thereby closing a gap at gate/seat boundary 265a that would otherwise form in prior art gate valves (biasing travel distance of seat 220a shown exaggerated in FIG. 4c for illustrative purposes only). This improves the seal between gate 225 and seat 220a at gate/seat boundary 265a and helps ensure that pressurized fluid 352 does not enter valve cavity 240 while gate 225 is in the closed position. The process then ends at step 520.

It should be noted that, upon continued opening and closing of gate valve 202, fracking fluid 350 and/or fluid 352 necessarily enters into seal cavities 440ax, 440bx, thereby equalizing pressure between seal cavities 440ax, 440ay and seal cavities 440bx, 440by when gate 225 is moved subsequently to the closing position. In such instances, only protrusions 432a, 432b of sand shields 430a, 430b (but not fluids within seal cavities 440ay, 440by) provide the biasing forces necessary to maintain seals between faces 260a, 260b of gate 225 and seat faces 310a, 310b of seats 220a, 220b.

Since increased pressure within bore sections 210a, 210b may cause a corresponding increase in bonding forces at gate/seat boundaries 265a, 265b, gate valve 202 better ensures that gate 225 stays in contact with seats 220a, 220b while gate 225 is in the closed position, regardless of the pressure differential between bore sections 210a, 210b. In this way, gate valve 202 is better capable of maintaining bi-directional pressures simultaneously. Furthermore, since both seats 220a, 220b maintain a contacting seal with gate 215 at all times when gate 225 is in the closed position, leakage of fluid between bore section 210a and bore section 210b via valve cavity 240 may not occur unless both gate/seat boundaries 265a, 265b contain leakage pathways formed from erosion and/or scratching. This is in contrast to prior art valves, which leak when only one gate/seat boundary contains a leakage pathway. Gate valve 202 is thus longer lasting and more tolerant of erosion and/or scratches compared to prior art gate valves.

Figure 6:
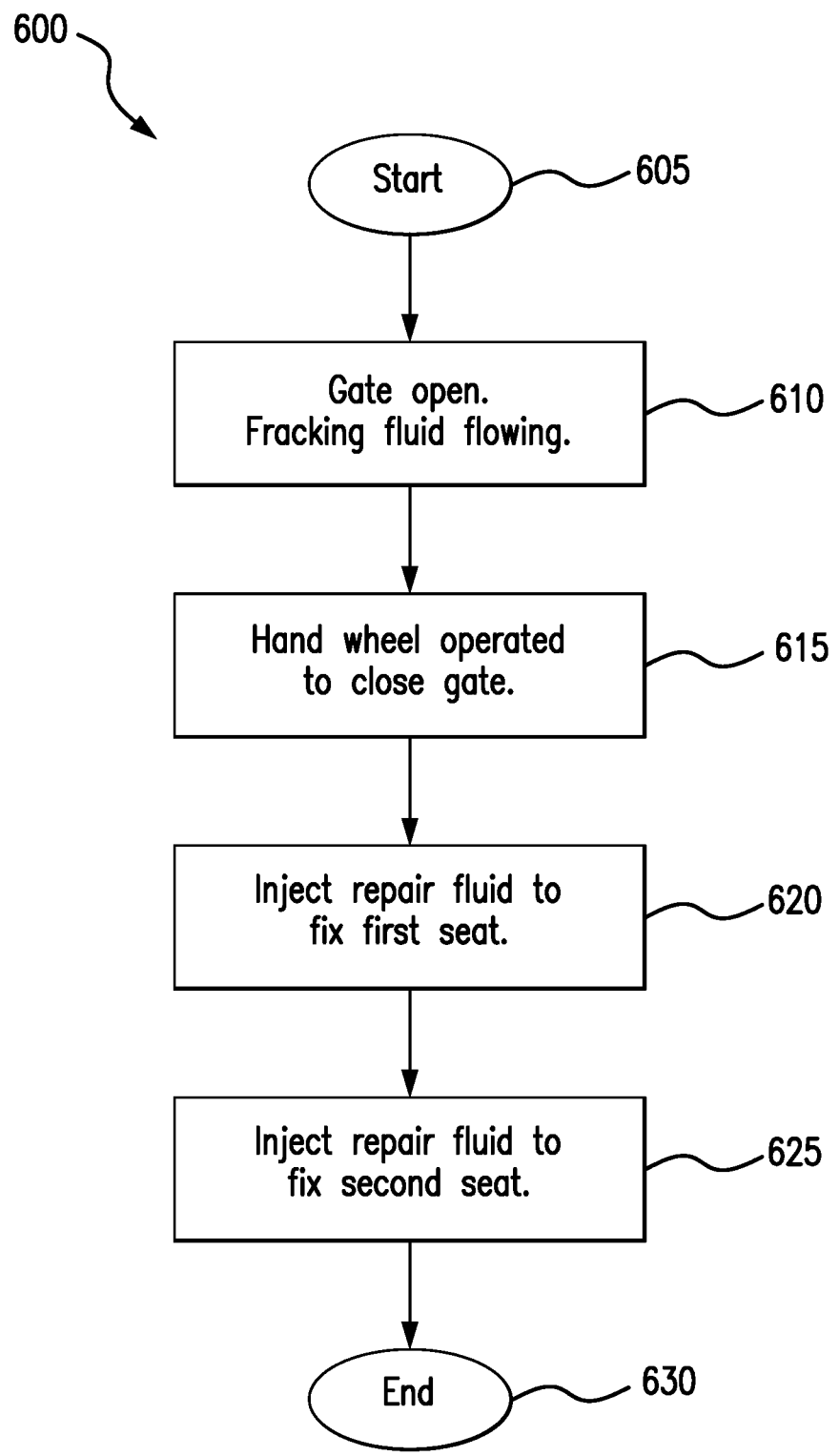
FIG. 6 is a process flow for repairing erosion and scratches at a gate/seat boundary, according to the present invention.
Figure 7A:
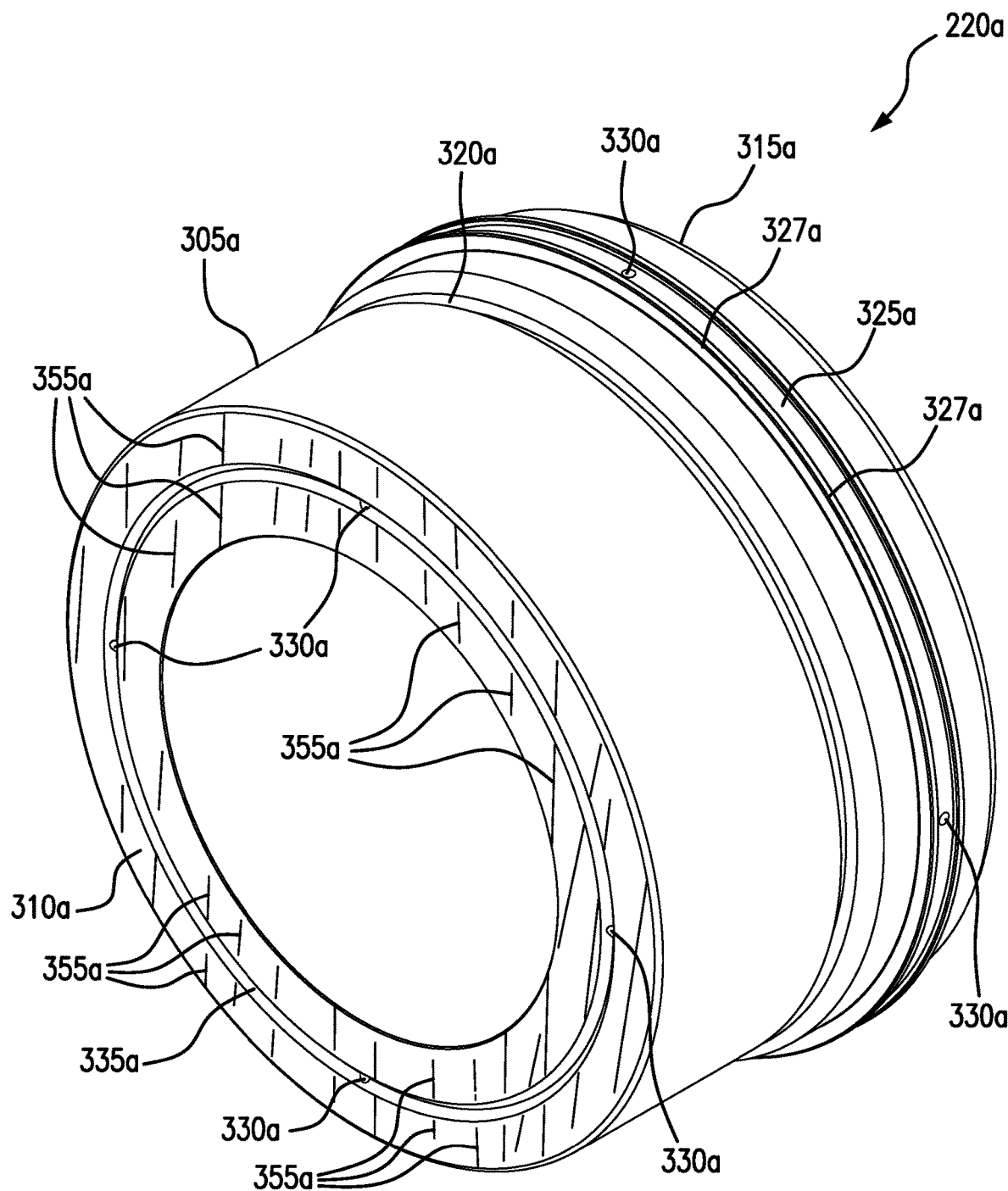
FIG. 7a is a perspective view of a seat having scratches on its face, according to the present invention.
Figure 7B:
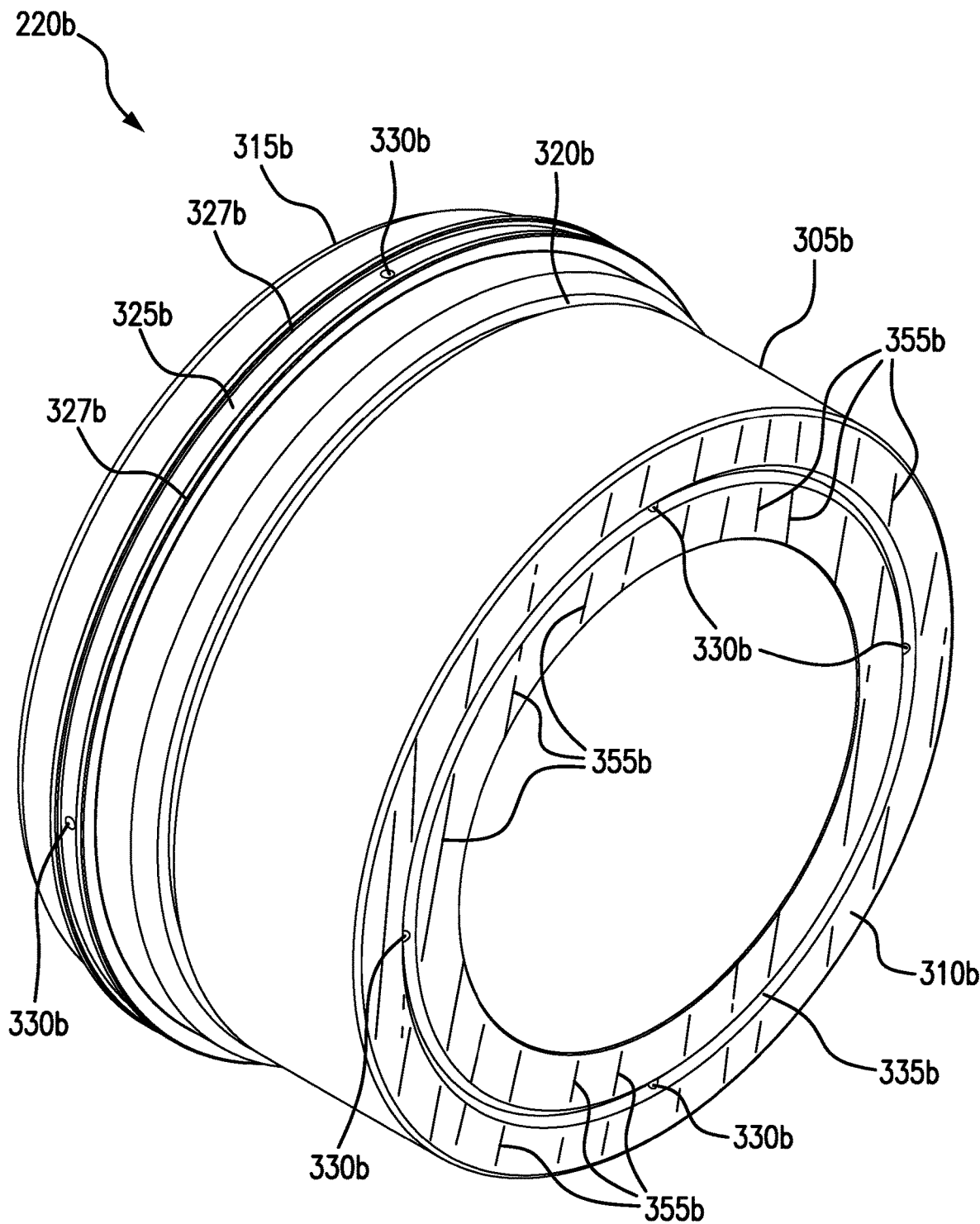
FIG. 7b is a perspective view of another seat having scratches on its face, according to the present invention.

Referring now to FIG. 6, there is seen a process 600 of repairing a gate valve 202 having leakage pathways formed at both gate seat boundaries 265a, 265b by erosion and/or scratching 355a, 355b (see FIGS. 7a and 7b showing erosion and/or scratches 355a, 355b on seat faces 310a, 310b of seats 220a, 220b). Process 600 is performed during operation of gate valve 202 and without need to cease fracking or other operations employing gate valve 202.

Figure 7C:
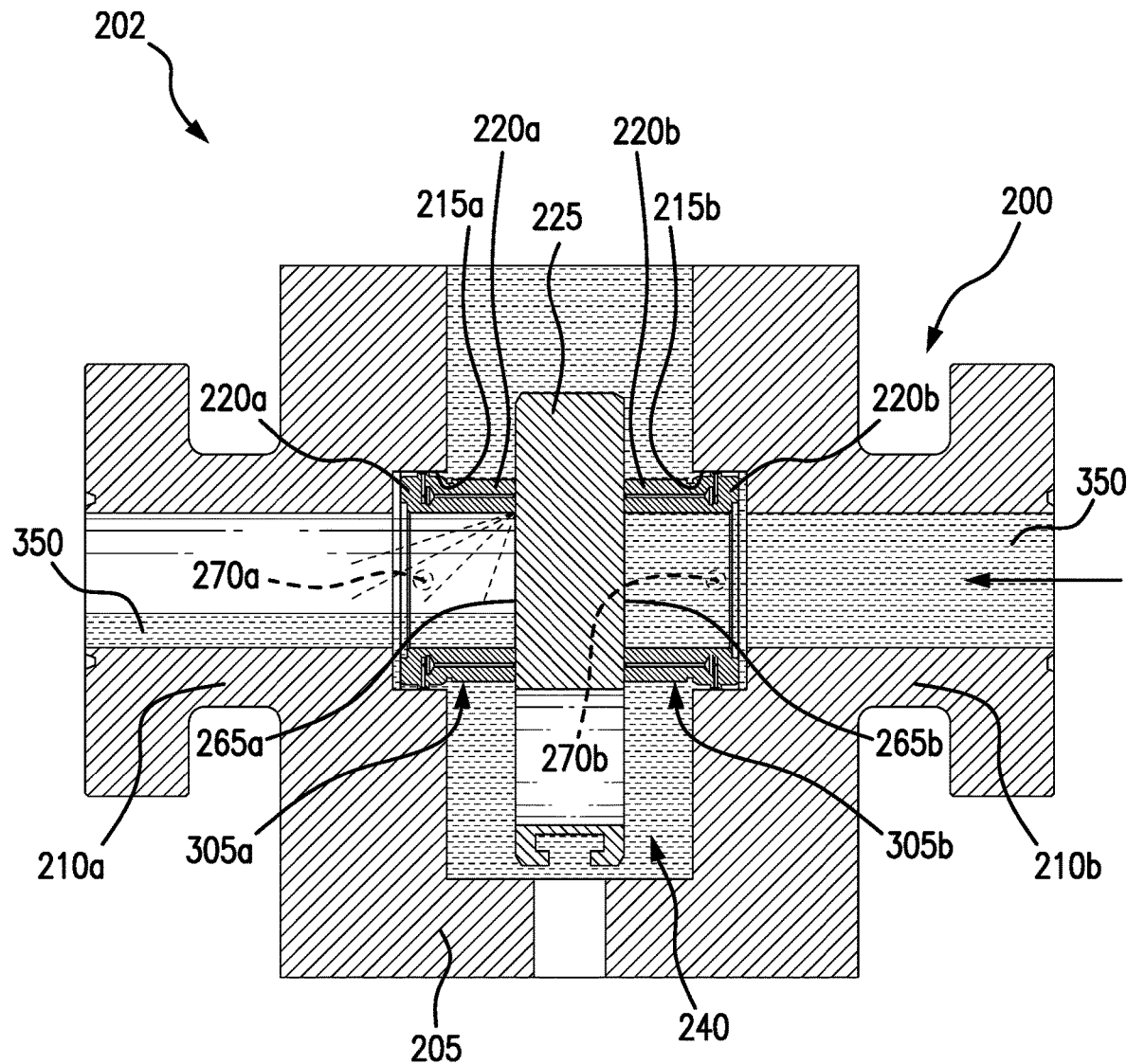
FIG. 7c is a sectional view of seats installed within a valve body with fluid leaking, according to the present invention.

Process 600 begins at step 605 and proceeds to step 610. At step 610, gate 225 is in an open position with fracking fluid 350 flowing through gate valve 202 from bore section 210b toward bore section 210a. The process then proceeds to step 615, at which a hand wheel (not shown) is operated to position gate 225 into the closed position for ceasing flow of fracking fluid 350 through gate valve 202. As shown in FIG. 7c, after closure of gate 225, erosion and/or scratches 355a, 355b at gate/seat boundaries 265a, 265b permit fracking fluid 350 to leak under pressure from bore section 210b to bore section 210a via gate/seat boundaries 265a, 265b and valve cavity 240.

The process then proceeds to step 620, at which a repair fluid, such as a stem pack grease containing Tetrafluoroethylene ("TFE"), is injected into fluid port 270a under high pressure. The repair fluid flows through fluid port 270a and into circumferential fluid channel 325a of seat 220a. After circumferential fluid channel 325a is filled with the repair fluid, pressure builds forcing the repair fluid through fluid conduits 330a and into circular face channel 335a at gate/seat boundary 265a between seat 220a and face 260a of gate 225. After the repair fluid fills circular face channel 335a, the repair fluid flows into and fills erosion and/or scratches 355a, thereby blocking leakage pathways at gate/seat boundary 265a and preventing flow of fracking fluid 350 from valve cavity 240 into bore section 210a.

It should be appreciated that repair of erosion and/or scratches 355b at gate/seat boundary 265b is unnecessary, as repair of erosion and/or scratches 355a and gate/seat boundary 265a is sufficient to prevent leakage of fracking fluid 350 from bore section 210b to bore section 210a. However, repair of gate/seat boundary 265b may provide more robust and long-lasting results by extending the operational time of gate valve 202 before a subsequent repair is required.

To the extent repair of gate/seat boundary 265b is desired, process 600 proceeds from step 620 to step 625, at which the repair fluid is injected into fluid port 270b under high pressure. The repair fluid flows through fluid port 270b and into circumferential fluid channel 325b of seat 220b. After circumferential fluid channel 325b is filled with the repair fluid, pressure builds forcing the repair fluid through fluid conduits 330b and into circular face channel 335b at gate/seat boundary 265b between seat 220b and face 260b of gate 225. After the repair fluid fills circular face channel 335b, the repair fluid flows into and fills erosion and/or scratches 355b, thereby blocking leakage pathways at gate/seat boundary 265b and preventing flow of fracking fluid 350 from bore section 210b into valve cavity 240. The process then ends at step 630.

The process for repairing erosion and/or scratches 355a, 355b may need to be repeated, as continued operation of gate valve 202 may cause some or all of the repair fluid to escape erosion and/or scratches 355a, 355b, thereby unblocking leakage pathways. With respect to at least one embodiment, the repair fluid may include one or more constituent ingredients that cure or harden to provide a longer lasting repair. It should also be appreciated that, although the above process 600 repairs erosion and/or scratches 355a, 355b on seats 220a, 220b, the same process may be followed for repairing erosion and/or scratching on faces 260a, 260b of gate 225 at gate/seat boundaries 265a, 265b.

While the present invention has been illustrated by description of various embodiments and while those embodiments have been described in considerable detail, it is not the intention of applicants to restrict or in any way limit the scope of the invention to such details. Additional advantages and modifications will readily appear to those skilled in the art. The invention in its broader aspects is therefore not limited to the specific details and illustrative examples shown and described. Departures may be made from such details without departing from the spirit or scope of the invention.

What is claimed is:

1. A gate valve for controlling flow of a fluid therethrough, the gate valve comprising:
   a valve body having a bore, an outer surface, an upper end, a valve cavity, a first seat pocket, a second seat pocket, a first fluid port extending from the outer surface to the first seat pocket, and a second fluid port extending from the outer surface to the second seat pocket;
   a first seat having a first seat face, a first outside surface, a first circumferential fluid channel provided on the first outside surface, at least one first conduit between the first circumferential fluid channel and the first seat face, the first seat being positioned within the first seat pocket of the valve body, the first fluid port being in fluid communication with the first circumferential fluid channel of the first seat, and a first shield pocket defined by a first laterally facing surface and a first radially inwardly facing surface of the first seat;
   a second seat having a second seat face, a second outside surface, a second circumferential fluid channel provided on the second outside surface, at least one second conduit between the second circumferential fluid channel and the second seat face, the second seat being positioned within the second seat pocket of the valve body, the second fluid port being in fluid communication with the second circumferential fluid channel of the second seat, and a second shield pocket defined by a second laterally facing surface and a second radially inwardly facing surface of the second seat;
   a bonnet coupled to the upper end of the valve body;
   a valve stem having a top end and a bottom end, the valve stem being rotatably positioned within the bonnet;
   a hand wheel coupled to the top end of the valve stem;
   a gate screwably coupled to the bottom end of the valve stem, the gate having a first surface and a second surface, the gate slidably positioned within the valve cavity between the first seat face of the first seat and the second seat face of the second seat, the gate configured to be selectively positioned into an open position for permitting flow of the fluid through the bore and a closed position for preventing flow of the fluid through the bore;
   a first sand shield having a first base adjacent the first radially inwardly facing surface, a first protrusion adjacent the first laterally facing surface of the first seat, a second protrusion adjacent the first seat pocket, and a first open end in fluid communication with the bore, the first sand shield biasing the first seat against the first surface of the gate;
   a second sand shield having a second base adjacent the second radially inwardly facing surface, a third protrusion adjacent the second laterally facing surface of the second seat, a fourth protrusion adjacent the second seat pocket, and a second open end in fluid communication with the bore, the second sand shield biasing the second seat against the second surface of the gate;
a first seal positioned within the first seat pocket;
a second seal positioned within the first seat pocket, the first circumferential fluid channel being between the first and second seals;
a third seal positioned within the second seat pocket; and
a fourth seal positioned within the second seat pocket, the second circumferential fluid channel being between the third and fourth seals.

2. The gate valve of claim 1, wherein the first and second protrusions of the first sand shield and the third and fourth protrusions of the second sand shield are each structured to bias radially when under pressure exerted by the fluid.

3. The gate valve of claim 1, wherein at least one of the first seal, the second seal, the third seal, and the fourth seal includes a seal ring, an energizing spring for biasing the seal ring radially outwardly into a sealing position, a standoff to provide support for the seal ring, and a back ring to provide an interface contact.

4. The gate valve of claim 1, wherein the at least one first conduit includes four first conduits.

5. The gate valve of claim 1, wherein the at least one second conduit includes four second conduits.

6. The gate valve of claim 1, wherein each of the first and second fluid ports of the valve body is provided with a grease fitting at the outer surface of the valve body.

7. The gate valve of claim 1, wherein the first seat face of the first seat is provided with a first face channel in fluid communication with the at least one first conduit, and the second seat face of the second seat is provided with a second seat channel in fluid communication with the at least one second conduit.

8. The gate valve of claim 1, wherein the first sand shield is an annular dome shaped sand shield having a substantially U-shaped longitudinal cross-section.

9. A gate valve for controlling flow of a fluid therethrough, the gate valve comprising:
a valve body having a bore, an outer surface, an upper end, a valve cavity, a first seat pocket, a second seat pocket, a first fluid port extending from the outer surface to the first seat pocket, and a second fluid port extending from the outer surface to the second seat pocket;
a first seat having a first seat face, a first outside surface, a first circumferential fluid channel provided on the first outside surface, at least one first conduit between the first circumferential fluid channel and the first seat face, the first seat being positioned within the first seat pocket of the valve body, the first fluid port being in fluid communication with the first circumferential fluid channel of the first seat, and wherein the at least one first conduit includes a first segment adjacent the first circumferential fluid channel having a first overall diameter and a second segment adjacent the first seat face having a second overall diameter less than the first overall diameter;
a second seat having a second seat face, a second outside surface, a second circumferential fluid channel provided on the second outside surface, at least one second conduit between the second circumferential fluid channel and the second seat face, the second seat being positioned within the second seat pocket of the valve body, the second fluid port being in fluid communication with the second circumferential fluid channel of the second seat, and wherein the at least one second conduit includes a third segment adjacent the second circumferential fluid channel having a third overall diameter and a fourth segment adjacent the second seat face having a fourth overall diameter less than the third overall diameter;
a bonnet coupled to the upper end of the valve body;
a valve stem having a top end and a bottom end, the valve stem being rotatably positioned within the bonnet;
a hand wheel coupled to the top end of the valve stem;
a gate screwably coupled to the bottom end of the valve stem, the gate slidably positioned within the valve cavity between the first seat face of the first seat and the second seat face of the second seat, the gate configured to be selectively positioned into an open position for permitting flow of the fluid through the bore and a closed position for preventing flow of the fluid through the bore;
a first seal positioned within the first seat pocket;
a second seal positioned within the first seat pocket, the first circumferential fluid channel being between the first and second seals;
a third seal positioned within the second seat pocket; and
a fourth seal positioned within the second seat pocket, the second circumferential fluid channel being between the third and fourth seals;
wherein each of the first and second outside surfaces include a pair of lips circumscribing and coplanar with the first and second circumferential fluid channels; and
wherein the first and second fluid ports are each structured to receive a repair fluid under pressure.

10. The gate valve of claim 9, wherein at least one of the first seal, the second seal, the third seal, and the fourth seal includes a seal ring, an energizing spring for biasing the seal ring radially outwardly into a sealing position, a standoff to provide support for the seal ring, and a back ring to provide an interface contact.

11. The gate valve of claim 9, wherein the at least one first conduit includes four first conduits.

12. The gate valve of claim 9, wherein the at least one second conduit includes four second conduits.

13. The gate valve of claim 9, wherein each of the first and second fluid ports of the valve body is provided with a grease fitting at the outer surface of the valve body.

14. The gate valve of claim 9, wherein the first seat face of the first seat is provided with a first face channel in fluid communication with the at least one first conduit, and the second seat face of the second seat is provided with a second seat channel in fluid communication with the at least one second conduit.

15. A gate valve for controlling flow of a fluid therethrough, the gate valve comprising:
a valve body having a bore, an upper end, a valve cavity, a first seat pocket, and a second seat pocket;
a first seat having a first seat face, the first seat being positioned within the first seat pocket of the valve body, and a first shield pocket defined by a first laterally facing surface and a first radially inwardly facing surface of the first seat;
a second seat having a second seat face, the second seat being positioned within the second seat pocket of the valve body, and a second shield pocket defined by a second laterally facing surface and a second radially inwardly facing surface of the second seat;
a bonnet coupled to the upper end of the valve body;
a valve stem having a top end and a bottom end, the valve stem being rotatably positioned within the bonnet;
a hand wheel coupled to the top end of the valve stem;

a gate screwably coupled to the bottom end of the valve stem, the gate having a first surface and a second surface, the gate slidably positioned within the valve cavity between the first seat face of the first seat and the second seat face of the second seat, the gate configured to be selectively positioned into an open position for permitting flow of the fluid through the bore and a closed position for preventing flow of the fluid through the bore;

a first sand shield having a first base adjacent the first radially inwardly facing surface, a first protrusion adjacent the first laterally facing surface of the first seat, a second protrusion adjacent the first seat pocket, and a first open end in fluid communication with the bore, the first sand shield biasing the first seat against the first surface of the gate; and a second sand shield having a second base adjacent the second radially inwardly facing surface, a third protrusion adjacent the second laterally facing surface of the second seat, a fourth protrusion adjacent the second seat pocket, and a second open end in fluid communication with the bore, the second sand shield biasing the second seat against the second surface of the gate.

16. The gate valve of claim 15, wherein the first and second protrusions of the first sand shield and the third and fourth protrusions of the second sand shield are each structured to bias radially when under pressure exerted by the fluid.

17. A gate valve for controlling flow of a pressurized fluid, the gate valve comprising:

a valve body having a bore for receiving the pressurized fluid, a valve cavity, a fluid port and a seat pocket having a side wall;

a seat positioned within the seat pocket, the seat having a rear surface, a seat face, an outside surface, a circumferential fluid channel on the outside surface in fluid communication with the fluid port of the valve body, at least one conduit between the circumferential fluid channel and the seat face, and a shield pocket defined by a laterally facing surface and a radially inwardly facing surface of the seat;

a gate slidably positioned within the valve cavity adjacent to the seat face of the seat, the gate configured to be selectively positioned into an open position for permitting flow of the fluid through the bore and a closed position for preventing flow of the fluid through the bore;

a first seal positioned within the seat pocket;

a second seal positioned within the seat pocket, the circumferential fluid channel being between the first and second seals; and a sand shield having a base adjacent the radially inwardly facing surface, a first protrusion adjacent the laterally facing surface of the seat, a second protrusion adjacent the seat pocket, and an open end in fluid communication with the bore, wherein the sand shield is structured to prevent proppant particles in the fluid from passing from the bore into a cavity between the rear surface of the seat and the side wall, the sand shield producing a biasing force to bias the seat against the gate;

wherein the sand shield is further structured to increase the biasing force when acted upon by the pressurized fluid.

18. The gate valve of claim 17, wherein at least one of the first and second seals includes a seal ring, an energizing spring for biasing the seal ring radially outwardly into a sealing position, a standoff to provide support for the seal ring, and a back ring to provide an interface contact.

19. The gate valve of claim 17, wherein the at least one conduit includes four conduits.

20. The gate valve of claim 17, wherein the fluid port is provided with a grease fitting at an outside surface of the valve body.

\* \* \* \* \*